United States Patent
Colligan et al.

(10) Patent No.: US 6,415,031 B1
(45) Date of Patent: Jul. 2, 2002

(54) SELECTIVE AND RENEWABLE ENCRYPTION FOR SECURE DISTRIBUTION OF VIDEO ON-DEMAND

(75) Inventors: Michael R. Colligan, Sunnyvale; Yong Ho Son, Palo Alto; Christopher Goode, Menlo Park, all of CA (US)

(73) Assignee: Diva Systems Corporation, Redwood City, CA (US)

( * ) Notice: Subject to any disclaimer, the term of this patent is extended or adjusted under 35 U.S.C. 154(b) by 0 days.

(21) Appl. No.: 09/528,580

(22) Filed: Mar. 20, 2000

Related U.S. Application Data

(63) Continuation-in-part of application No. 09/267,800, filed on Mar. 12, 1999, now Pat. No. 6,229,895.
(60) Provisional application No. 60/131,162, filed on Apr. 26, 1999, and provisional application No. 60/128,224, filed on Apr. 7, 1999.
(51) Int. Cl.$^7$ .............................. H04N 7/167; H04L 9/00
(52) U.S. Cl. ........................................ 380/200; 713/160
(58) Field of Search .............................. 725/29, 31, 87; 380/200, 210, 211, 239; 713/153, 160, 162

(56) References Cited

U.S. PATENT DOCUMENTS

| | | | |
|---|---|---|---|
| 5,420,866 A | 5/1995 | Wasilewski | 370/110.1 |
| 5,666,487 A | 9/1997 | Goodman et al. | 395/200.76 |
| 5,721,778 A | 2/1998 | Kubota et al. | 380/10 |

Primary Examiner—Matthew Smithers
(74) Attorney, Agent, or Firm—Moser, Patterson & Sheridan LLP

(57) ABSTRACT

Selective encryption is provided in a process which includes: determining whether a predetermined criterion is satisfied; setting a selective encryption status field if the predetermined criterion is satisfied; and encrypting an unencrypted payload to generate an encrypted payload, and constructing a packet with the encrypted payload, if the predetermined criterion is satisfied. The predetermined criterion may be one of several criteria, each of which reduce the required amount of encryption and decryption while maintaining a high level of security. Renewable encryption is provided in a process which includes: copying a first encrypted digital video program from a remote server to a video source; decrypting the first encrypted digital video program using a first key to generate an unencrypted digital video program; encrypting the unencrypted digital video program using a second key to generate a second encrypted digital video program; transmitting the second encrypted digital video program from the video source to the remote server; and deleting the first encrypted digital video program from the remote server.

23 Claims, 24 Drawing Sheets

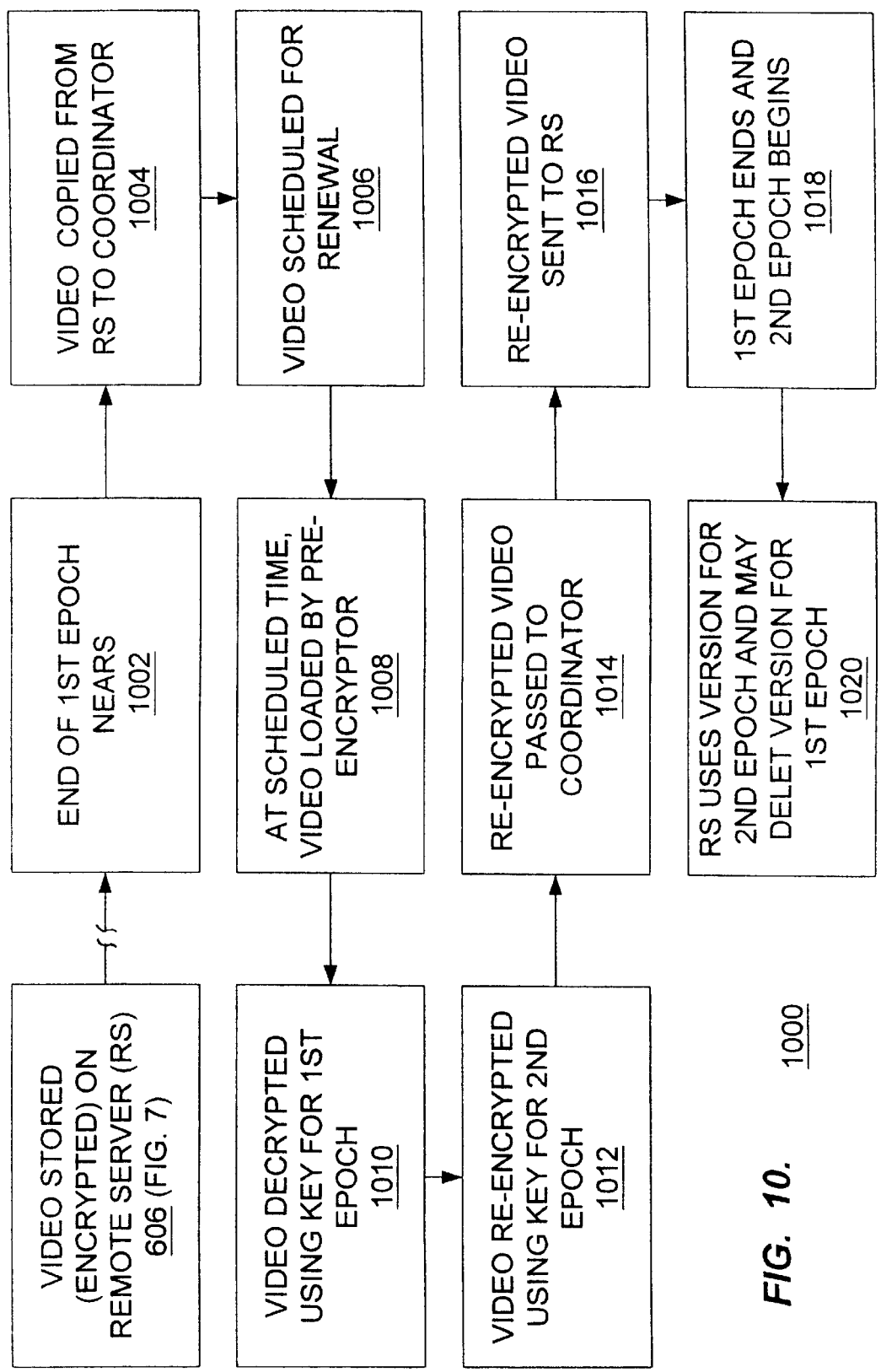
FIG. 10.    1000

SELECTIVE AND RENEWABLE ENCRYPTION FOR SECURE DISTRIBUTION OF VIDEO ON-DEMAND

CROSS-REFERENCES TO RELATED APPLICATIONS

The present application is based on provisional application "Selective Encryption," Ser. No. 60/131,162, filed Apr. 26, 1999, by inventors Michael Colligan, Yong Ho Son, and Christopher Goode. The present application is also based on provisional application "Time Dependency on Pre-Encryption for Video On-Demand Systems," Ser. No. 60/128,224, filed Apr. 7, 1999, by inventor Yong Ho Son. In addition, the present application is a continuation-in-part of utility application "Secure Distribution of Video On-Demand," Ser. No. 09/267,800, filed Mar. 12, 1999, now U.S. Pat. No. 6,229,895, by inventors Yong Ho Son and Christopher Goode.

BACKGROUND OF THE INVENTION

1. Field of the Invention

This invention relates generally to the field of video distribution networks. In particular, this invention relates to secure video distribution networks.

2. Description of the Background Art

Security is an important issue for video distribution networks. Issues of security are particularly important with regards to the distribution of digital video.

Distribution of digital cable television channels currently follows a broadcast model in that the digital cable television channels are broadcast from the broadcast source to many subscriber stations at once. Security for the distribution of digital cable television channels also follows a broadcast model. A digital cable television channel is fully encrypted in real-time at the time of the broadcast from the broadcast source. Authorization keys allow subscribing users to decrypt and view the broadcast content. Such authorization keys must somehow, at sometime, be delivered to the subscribing users. It is not practical to deliver authorization keys at the same time that encrypted content is broadcast because verification of the delivery is difficult to do immediately and interactively using current cable television networks. Hence, delivery of the authorization keys occurs periodically on a time-based schedule, where the periodicity of the delivery is known as a time quantum or time epoch. The time epoch is typically related to the billing cycle (for example, monthly) for the cable television service.

Unlike distribution of digital cable television channels, distribution of digital video on-demand (VOD) follows a pointcast model in that the content is transmitted from a video server to each individual viewer. Due to the nature of pointcasting, a security scheme for digital VOD which is based on the model provided by security for cable television broadcasts would be impractical and expensive. First, fully encrypting the digital VOD in real-time every time the digital video is transmitted from the server to an individual viewer is quite expensive in both cost and space usage for encryption equipment. Second, having a time epoch correlated to the billing cycle of the digital VOD service (for example, monthly) is a scheduling scheme that may create security risks which inhibits optimal protection of the content.

SUMMARY OF THE INVENTION

The present invention solves the problems discussed above by selective and renewable encryption for secure distribution of digital video on-demand. Selective encryption is provided in a process which includes: determining whether a predetermined criterion is satisfied; setting a selective encryption status field if the predetermined criterion is satisfied; and encrypting an unencrypted payload to generate an encrypted payload, and constructing a packet with the encrypted payload, if the predetermined criterion is satisfied. The predetermined criterion may be one of several criteria, each of which reduce the required amount of encryption and decryption while maintaining a high level of security. Renewable encryption is provided in a process which includes: copying a first encrypted digital video program from a remote server to a video source; decrypting the first encrypted digital video program using a first key to generate an unencrypted digital video program; encrypting the unencrypted digital video program using a second key to generate a second encrypted digital video program; transmitting the second encrypted digital video program from the video source to the remote server; and deleting the first encrypted digital video program from the remote server.

BRIEF DESCRIPTION OF THE DRAWINGS

FIG. 10 is a flow chart depicting a renewal process (1000) for encrypting (502, 602, or 702) content at a VOD source (402) in accordance with a preferred embodiment of the present invention.

DETAILED DESCRIPTION OF THE SPECIFIC EMBODIMENTS

Figure 1:
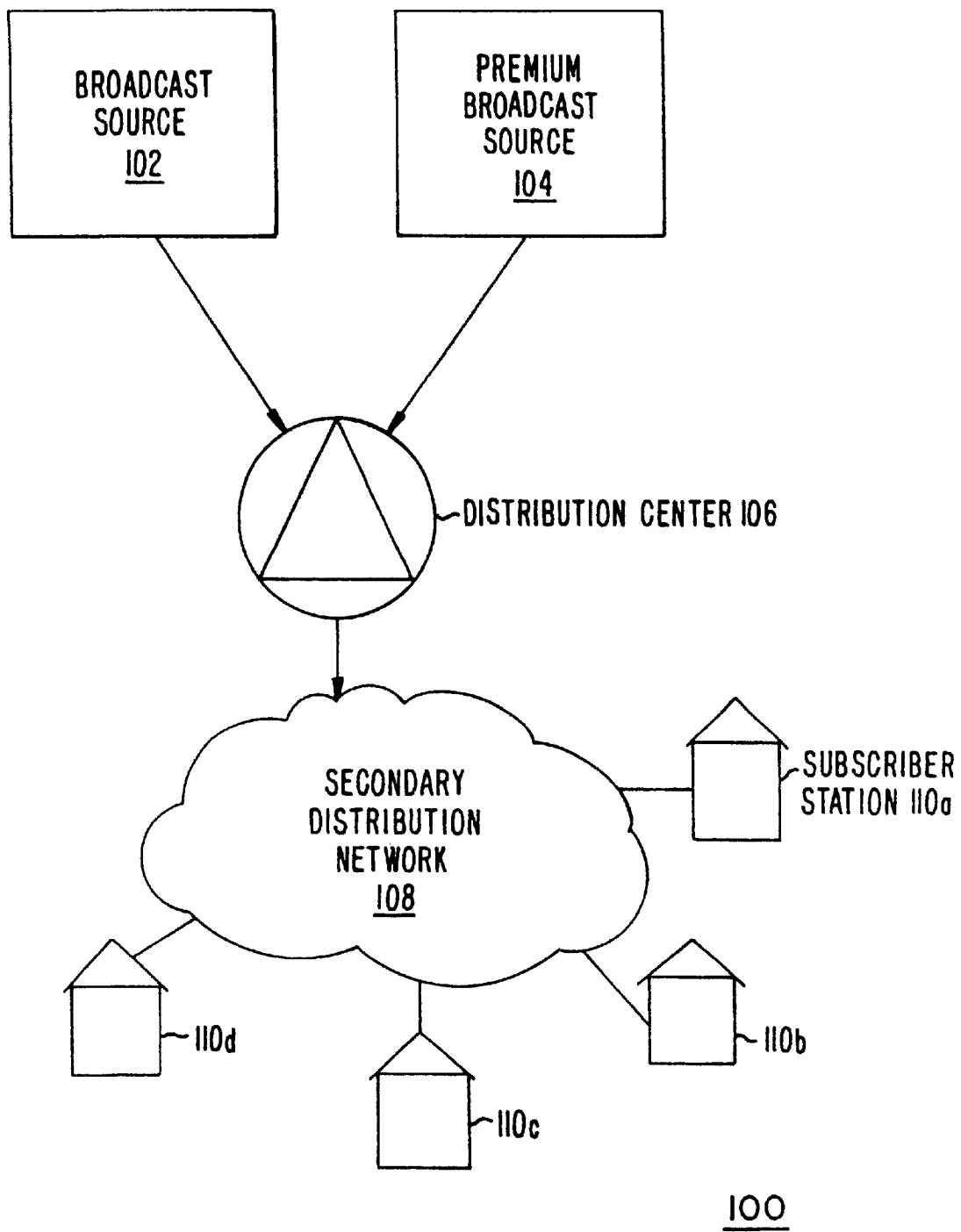
FIG. 1 is a schematic diagram of a conventional cable distribution network (100).

FIG. 1 is a schematic diagram of a conventional cable distribution network (100). The conventional cable distribution network (100) typically includes one or more broadcast sources (102), one or more premium broadcast sources (104), one or more distribution centers (106), one or more secondary distribution networks (108), and a plurality of subscriber stations (110).

The broadcast source (102) may be, for example, a local television station. For instance, an affiliate station of a major network such as ABC, NBC, CBS, FOX, or UPN. The premium broadcast source (104) may be, for example, a premium channel such as HBO, Showtime, Cinemax, and so on. The sources (102) and (104) may be coupled via a primary distribution network to the distribution center (106). The distribution center (106) may be, for example, a cable head-end. The distribution center (106) may be coupled via a secondary distribution network (108) to the subscriber stations (110). The secondary distribution network (108) may include, for example, various amplifiers, bridges, taps, and drop cables. Finally, the subscriber stations (110) may be, for example, set-top boxes and associated television equipment for viewing the video content by end users.

Figure 2:
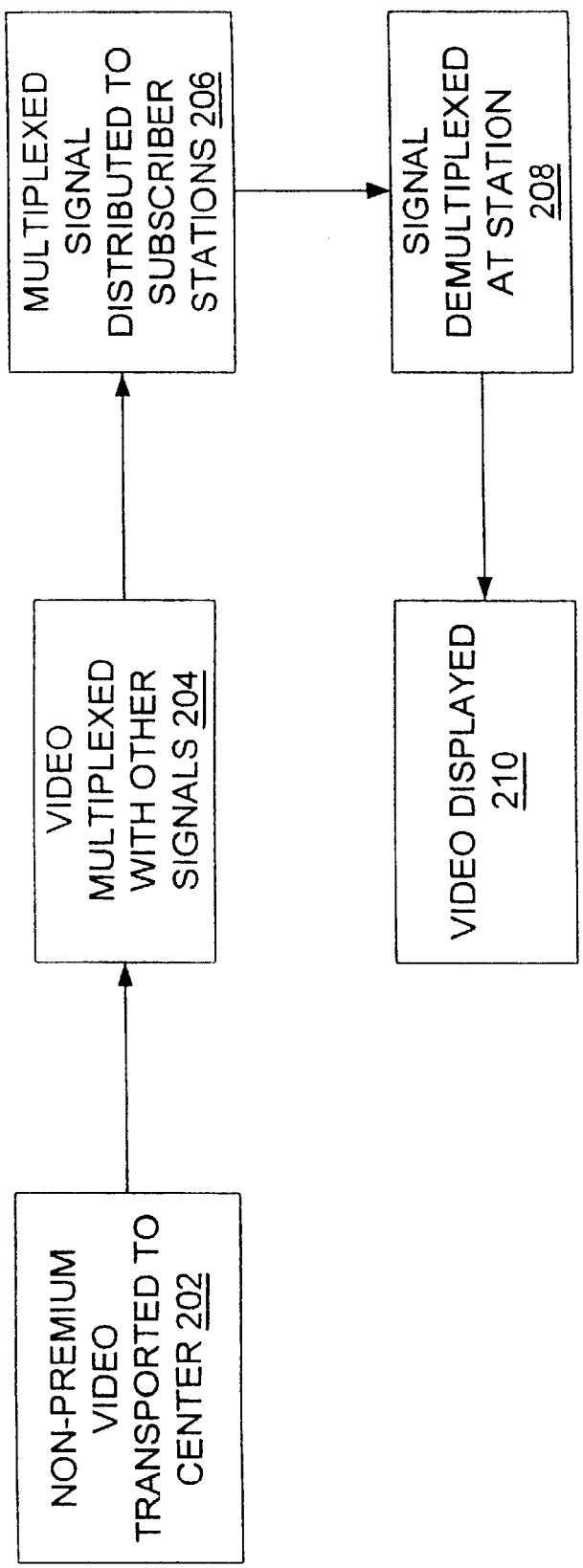
FIG. 2 is a flow chart depicting a conventional insecure process (200) for distributing video content via a conventional cable distribution network (100).

FIG. 2 is a flow chart depicting a conventional insecure process (200) for distributing video content via a conventional cable distribution network. First, a non-premium video signal is transported (202) from the broadcast source (102) to the distribution center (106). At the distribution center (106), the video signal is multiplexed (204) with other signals to generate a multiplexed signal. The multiplexed signal is then distributed (206) from the distribution center (106) via the secondary distribution network (108) to the subscriber stations (110). At the subscriber stations (110), the multiplexed signal is demultiplexed (208) to isolate the video signal, and then the video signal is displayed 210, typically, on a television monitor.

Figure 3A:
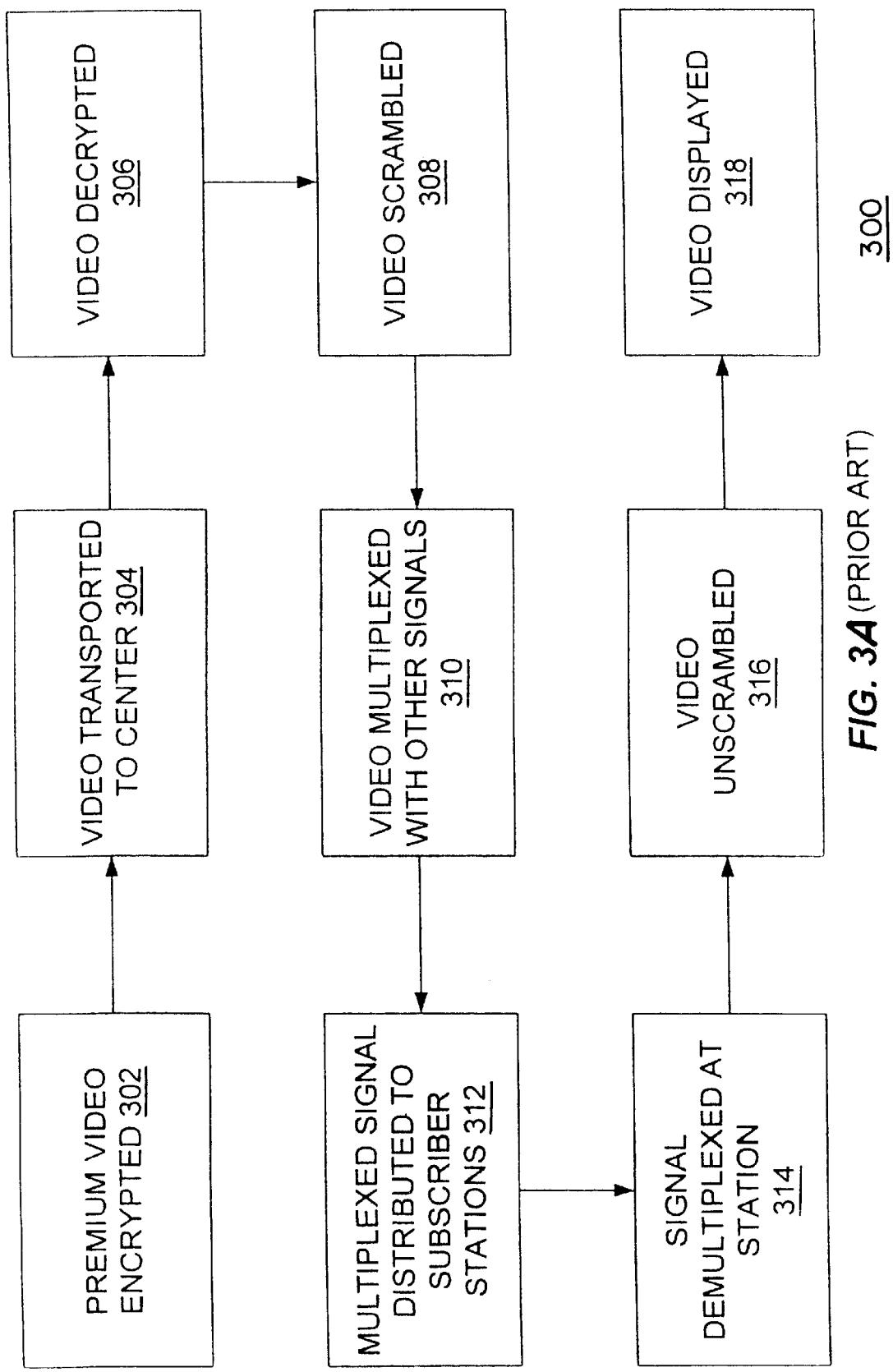
FIG. 3A is a flow chart depicting a conventional secure process (300) for distributing premium video content via a conventional cable distribution network (100).

FIG. 3A is a flow chart depicting a conventional secure process (300) for distributing video content via a conventional cable distribution network. First, a premium video signal is encrypted (302) to generate an encrypted signal. The encrypted signal is transported (304) from the premium broadcast source (104) to the distribution center (106).

At the distribution center (106), the video signal is decrypted (306) to regenerate the premium video signal. The premium video signal is then scrambled (308)—re-encrypted with a different key and multiplexed (310) with other signals to generate a multiplexed signal. The multiplexed signal is then distributed (312) from the distribution center (106) via the secondary distribution network (108) to the subscriber stations (110).

At the subscriber stations (110), the multiplexed signal is demultiplexed (314) to isolate the scrambled video signal, the scrambled video signal is unscrambled (316), and then the video signal is displayed (318), typically, on a television monitor connected to a set-top box. The process in FIG. 3 is a typical conventional process for delivering premium video using scrambling. Other conventional processes also exist.

Figure 3B:
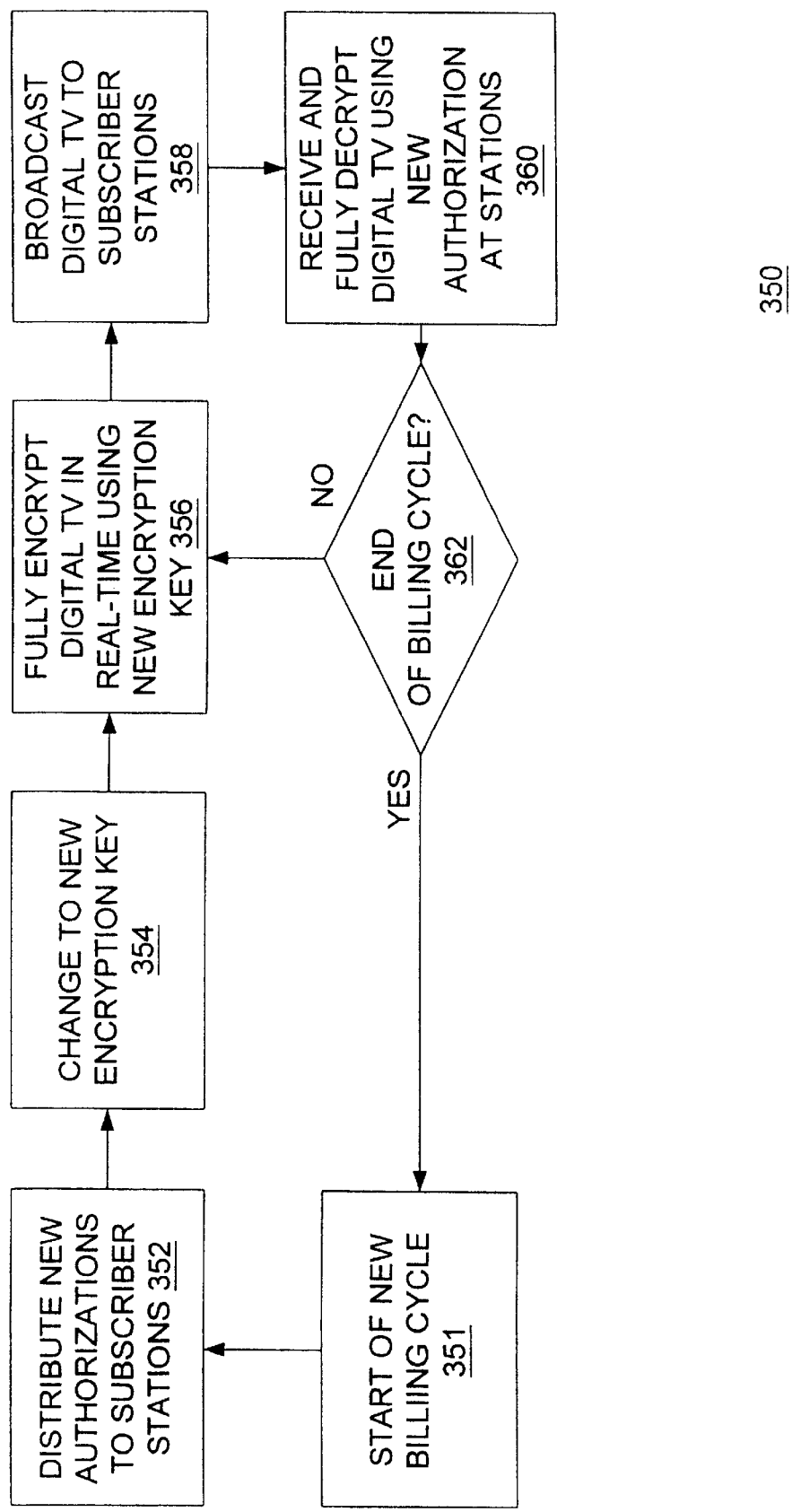
FIG. 3B is a flow chart depicting a conventional secure process (350) for distributing digital television broadcasts via a conventional cable distribution network (100).

FIG. 3B is a flow chart depicting a conventional secure process (350) for distributing premium digital television broadcasts via a conventional cable distribution network (100). The process (350) begins in a first step (351) when a new billing cycle starts. In a second step (352), new authorizations are distributed from the premium broadcast source (104) to subscriber stations (110) via the conventional cable distribution network (100). Of course, the new authorizations are distributed to only subscriber stations (110) that are subscribing to the premium digital TV for the new billing cycle.

In a third step (354), the encryption system in the premium broadcast source (104) changes to a new encryption key for use in encrypting the premium digital TV broadcast. The new encryption key corrresponds to the new billing cycle. In a fourth step (356), the encryption system in the premium broadcast source (104) fully encrypts the premium digital TV in real-time using the new encryption key. In a fifth step (358), the encrypted premium digital TV is broadcast to the subscriber stations (110) via the conventional cable distribution network (100). In a sixth step (360), the subscriber stations (110) receive and fully decrypt the encrypted premium digital TV using the new authorizations. Of course, only subscriber stations (110) which are subscribing to the premium digital TV broadcast for the new billing cycle have the new authorizations and so only they are able to fully decrypt the encrypted broadcast.

In a seventh step (362), a determination is made as to whether an end of the new billing cycle is being reached. If the end is not being reached, then the process (350) loops back to the fourth step (356) where the premium digital TV continues to be encrypted in real-time and then broadcast. Otherwise, if the end is being reached, then the process (350) goes on back to the first step (351) where a new billing cycle starts.

Figure 4:
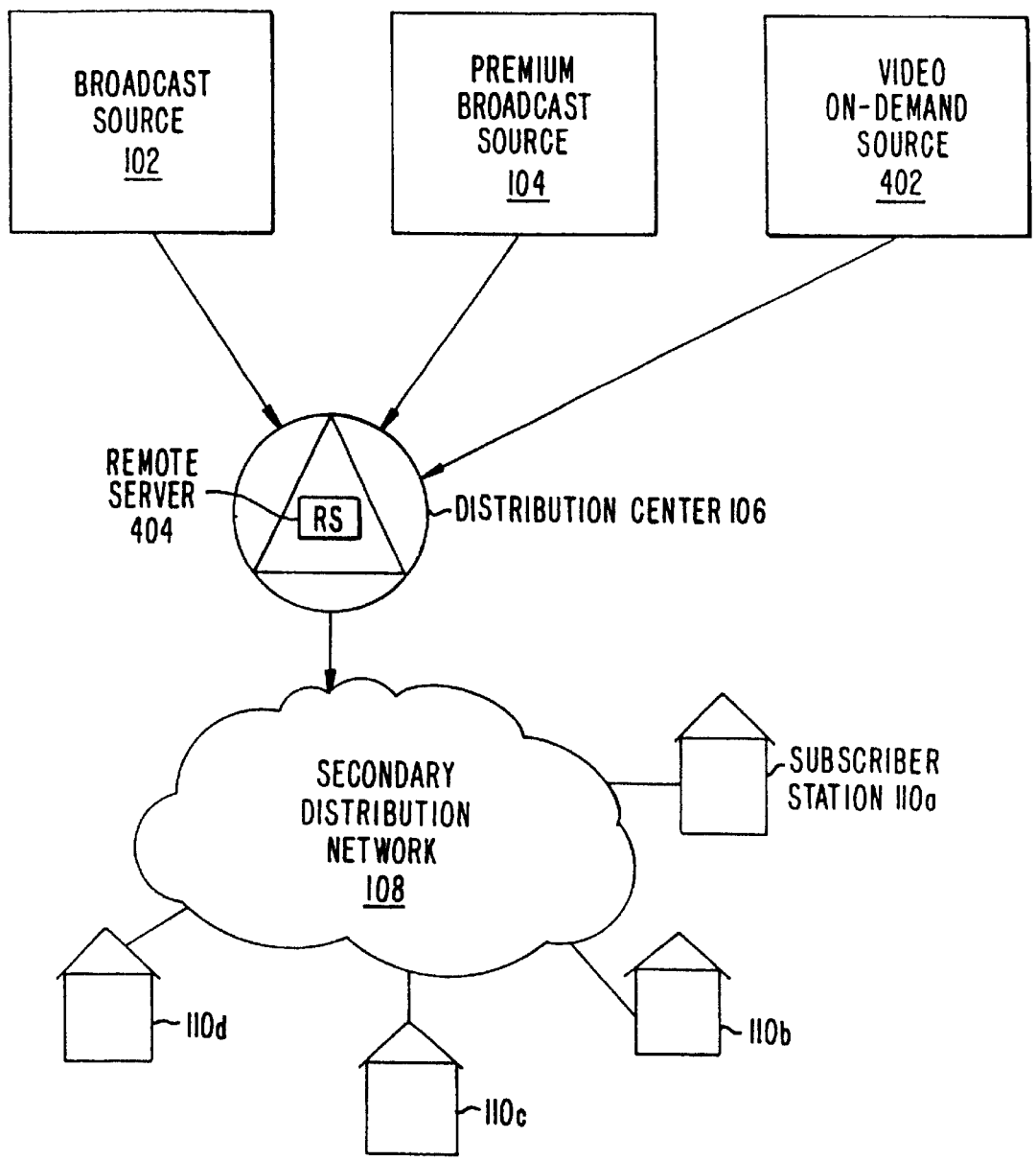
FIG. 4 is a schematic diagram of a cable distribution network (400) including a video on-demand source (402) in accordance with a preferred embodiment of the present invention.

FIG. 4 is a schematic diagram of a cable distribution network (400) including a video on-demand source (402) in accordance with a preferred embodiment of the present invention. In addition to the components of the conventional cable distribution network (100) shown in FIG. 1, the cable distribution network (400) shown in FIG. 4 includes a video on-demand source (402) and a remote server (404). The video on-demand source (402) may house, for example, a collection of video programs such as, for example, movies. As shown in FIG. 4, the remote server (404) may be located within the distribution center (106). The remote server (404) may include, for example, a parallel processing computer configured to be a video server, a disk drive array to store video data, and a video session manager to provide session control of the video data flowing to and from the video server.

Figure 5A:
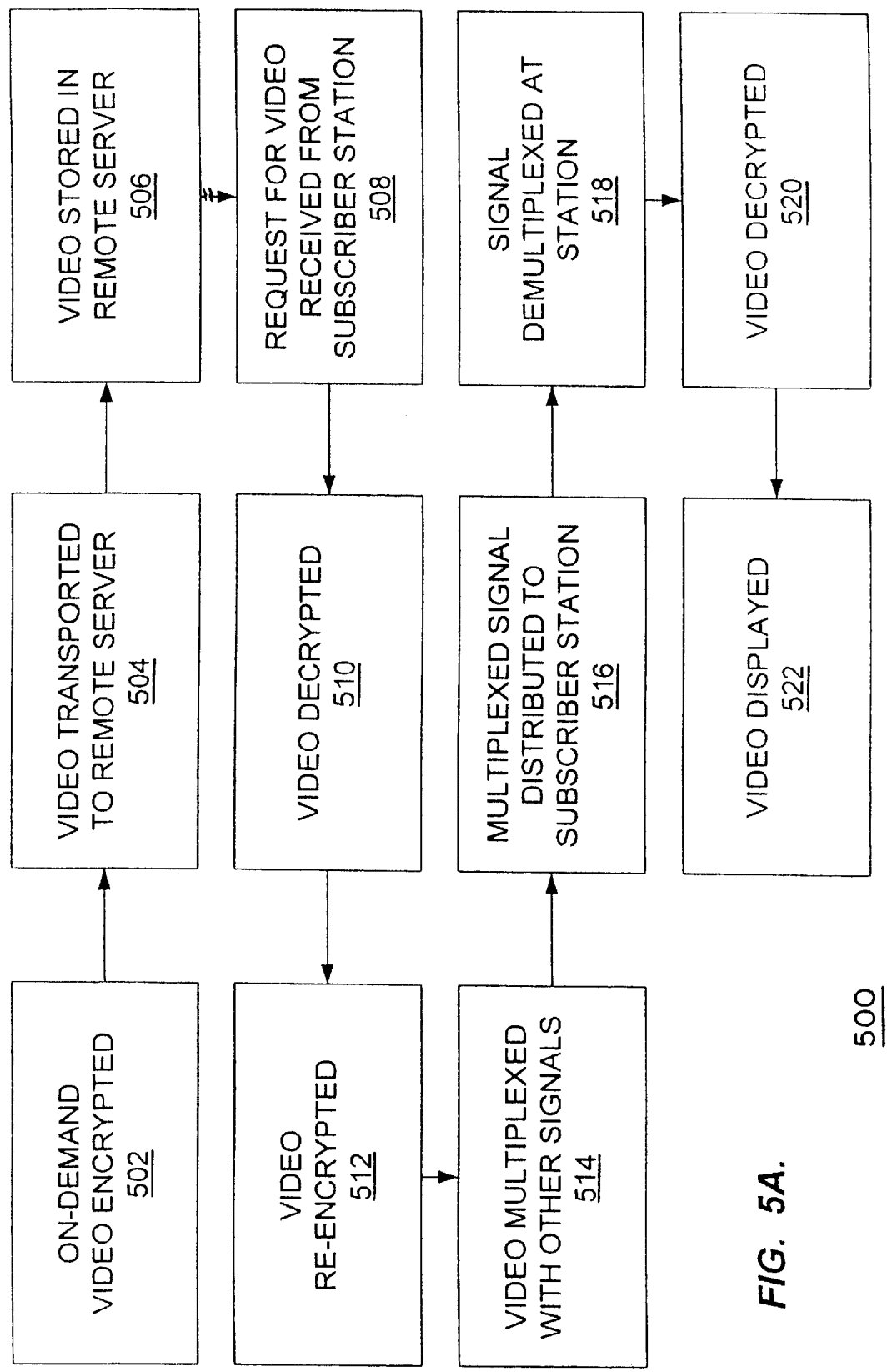
FIG. 5A is a flow chart depicting a secure process (500) for distributing video on-demand content via a cable distribution network (400) in accordance with a first aspect of the present invention.

FIG. 5A is a flow chart depicting a secure process (500) for distributing video on-demand content via a cable distribution network (400) in accordance with a first aspect of the present invention. The process depicted in FIG. 5A may be called a store, decrypt, and re-encrypt process.

First, a video program is encrypted (502) by a video on-demand source (402) to generate an encrypted program in a first encrypted form. The encrypted program is transported (504) via a primary distribution network from the video on-demand source (402) to a remote server (404) within a distribution center (106). The encrypted program is then stored (506) in the remote server (404).

Subsequently, when the remote server (404) receives (508) a request for transmission of the video program from a subscriber station (110), the remote server (404) responds by first decrypting (510) the video program from the first encrypted form. A first key is may be used to accomplish such decryption (510), and such key may have been received from the video on-demand source (402) via a communication channel that is separate from the one used to transmit the video program. After the video program is decrypted (510), the remote server (404) re-encrypts (512) the video program into a second encrypted form using a second key.

The second key may be a public key of a public key encryption system. Such a public key encryption system uses two different keys: a public key to encrypt data, and a private key to decrypt data. In that case, decryption would be accomplished using a corresponding private key of the public key encryption system. Examples of such a public key encryption system is encryption under the PGP (Pretty Good Privacy) system or under the RSA (Rivest, Shamir, and Adleman) system. Alternatively, the second key may be a private key of a private key encryption system. Such a private key encryption system uses a single private key to encrypt and decrypt data. Examples of such a private key encryption system is encryption under the Data Encryption Standard (DES) or under triple-DES, which involves applying DES three times to enhance security. The private key(s) itself may be transmitted from the remote server (404) to the subscriber station (110) while encrypted in a third encrypted form.

After the video program is re-encrypted (512), the re-encrypted program in the second encrypted form (and the second key if necessary) is multiplexed (514) with other signals to generate a multiplexed signal. The multiplexed signal is then distributed (516) via the secondary distribution network (108) to the subscriber stations (110).

At the subscriber stations (110), the multiplexed signal is demultiplexed (518) to isolate the re-encrypted program in the second encrypted form (and the second key if necessary), the re-encrypted program is decrypted (520) from the second encrypted form to generate the unencrypted video program, and then the video program is displayed (522), typically, on a television monitor connected to set-top box.

Figure 5B:
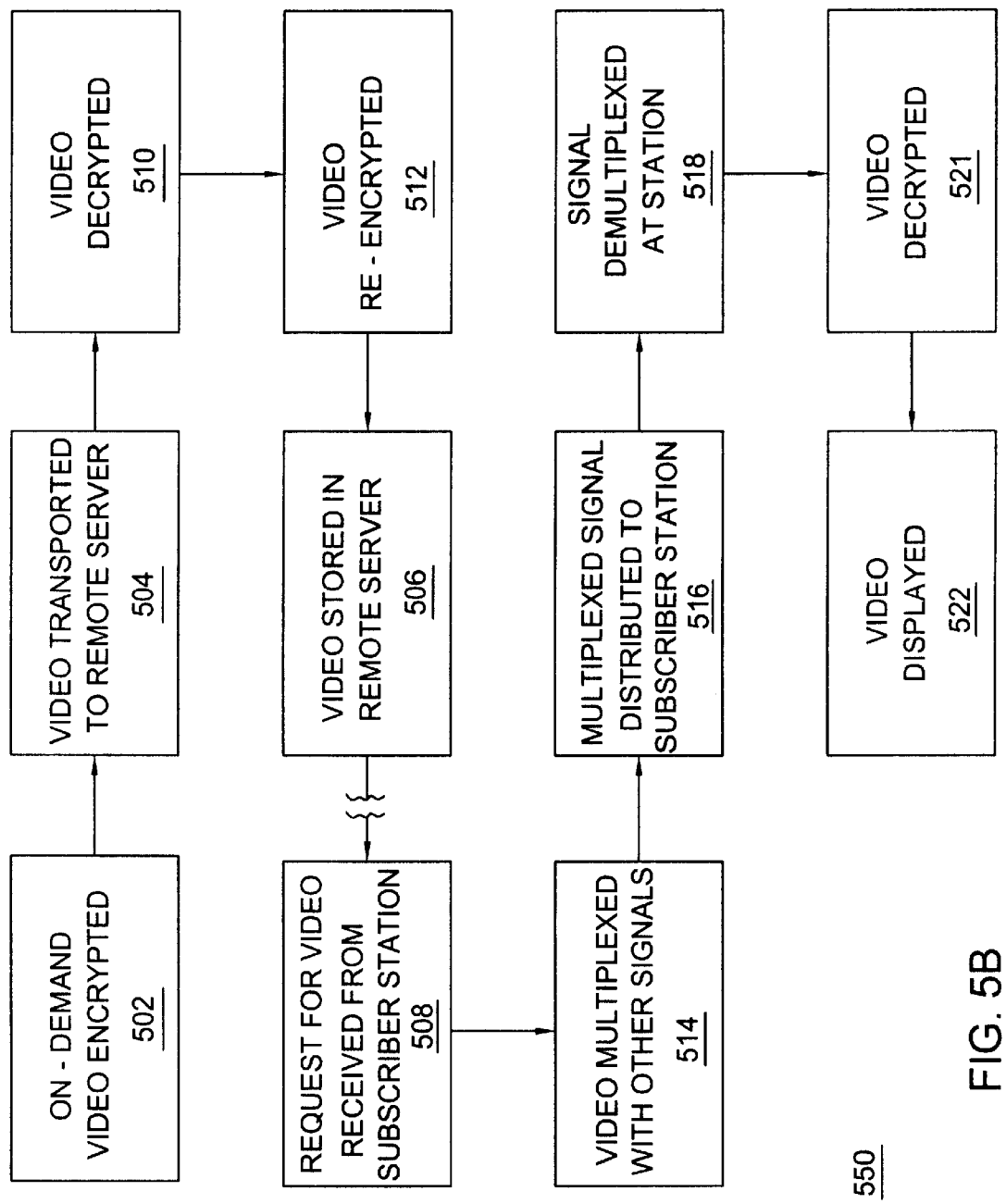
FIG. 5B is a flow chart depicting a secure process (550) for distributing video on-demand content via a cable distribution network (400) in accordance with a second aspect of the present invention.

FIG. 5B is a flow chart depicting a secure process (550) for distributing video on-demand content via a cable distribution network (400) in accordance with a second aspect of the present invention. The process (550) depicted in FIG. 5B may be called a decrypt, re-encrypt, and store process. In comparison with the process (500) in FIG. 5A, the process (550) in FIG. 5B decrypts (510) and re-encrypts (512) the video program before the video program is stored (506) in the remote server (404).

First, a video program is encrypted (502) by a video on-demand source (402) to generate an encrypted program in a first encrypted form. The encrypted program is transported (504) via a primary distribution network from the video on-demand source (402) to a remote server (404) within a distribution center (106). At this point, the remote server (510) decrypts (510) the video program from the first encrypted form. A first key may be used to accomplish such decryption (510), and such key may have been received from the video on-demand source (402) via a communication channel that is separate from the one used to transmit the video program. After the video program is decrypted (510), the remote server (404) re-encrypts (512) the video program into a second encrypted form using a second key. After the decryption (510) and re-encryption (510), the re-encrypted program is then stored (506) in the remote server (404).

Note that step (506) in FIG. 5B differs from step (506) in FIG. 5A in that step (506) in FIG. 5B involves storing the video program in the second encrypted form while step (506) in FIG. 5A involves storing the video program in the first encrypted form.

Subsequently, when the remote server (404) receives (508) a request for transmission of the video program from a subscriber station (110), the remote server (404) responds by multiplexing (514) the re-encrypted program in the second encrypted form (and the second key if necessary) with other signals to generate a multiplexed signal. The multiplexed signal is then distributed (516) via the secondary distribution network (108) to the requesting subscriber station (110).

At the subscriber stations (110), the multiplexed signal is demultiplexed (518) to isolate the re-encrypted program in the second encrypted form (and the second key if necessary), the re-encrypted program is decrypted (520) from the second encrypted form to generate the unencrypted video program, and then the video program is displayed (522), typically, on a television monitor connected to set-top box.

Figure 6:
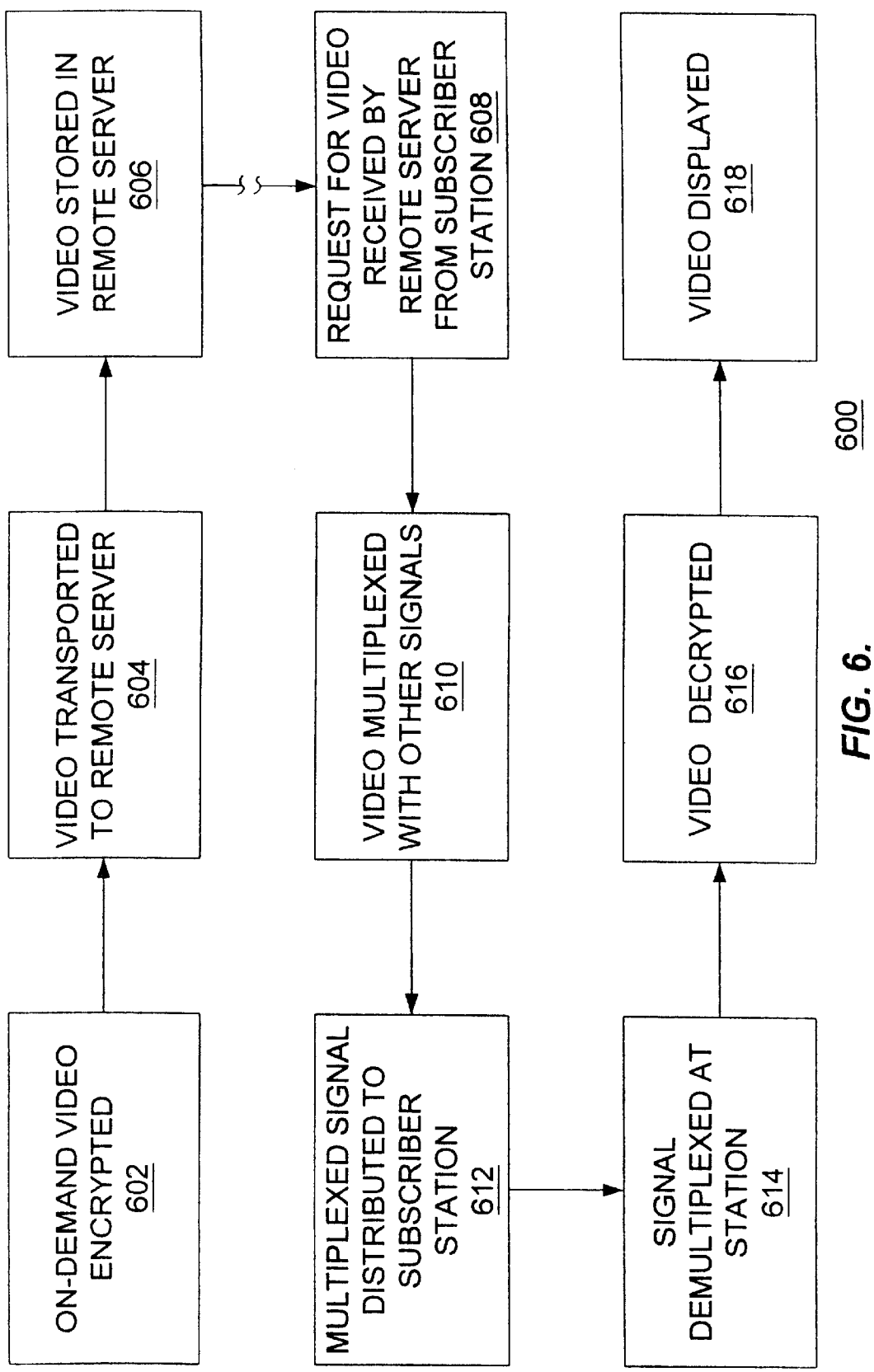
FIG. 6 is a flow chart depicting a secure process (600) for distributing video on-demand content via a cable distribution network (400) in accordance with a third aspect of the present invention.

FIG. 6 is a flow chart depicting a secure process (600) for distributing video on-demand content via a cable distribution network (400) in accordance with a third aspect of the present invention. The process (600) depicted in FIG. 6 may be called a pass-through process.

First, a video program is encrypted (602) by a video on-demand source (402) to generate an encrypted program in a first encrypted form. The encrypted program is transported (604) via a primary distribution network from the video on-demand source (402) to a remote server (404) within a distribution center (106). A key to decrypt the encrypted program may also be transported from the source (402) to the server (404). The encrypted program is then stored (606) in the remote server (404).

The key may be a public key of a public key encryption system. Such a public key encryption system uses two different keys: a public key to encrypt data, and a private key to decrypt data. In that case, decryption would be accomplished using a corresponding private key of the public key encryption system. Examples of such a public key encryption system is encryption under the PGP (Pretty Good Privacy) system or under the RSA (Rivest, Shamir, and Adleman) system. Alternatively, the key may be a private key of a private key encryption system. Such a private key encryption system uses a single private key to encrypt and decrypt data. Examples of such a private key encryption system is encryption under the Data Encryption Standard (DES) or under triple-DES which involves applying DES three times to enhance security. The private key(s) itself may be transmitted from the source (402) to the server (404) while encrypted in a second encrypted form. Alternatively, the private key(s) may be transported from the source (402) to the server (404) via a communication channel, which is separate from the communication channel used to transport the video program from the source (402) to the server (404).

Subsequently, when the remote server (404) receives (608) a request for transmission of the video program from a subscriber station (110), the remote server (404) responds by multiplexing (610) the encrypted program in the first encrypted form (and the key if necessary) with other signals to generate a multiplexed signal. The multiplexed signal is then distributed (612) via the secondary distribution network (108) to the requesting subscriber station (110).

At the subscriber stations (110), the multiplexed signal is demultiplexed (614) to isolate the encrypted program in the first encrypted form (and the key if necessary), the encrypted program is decrypted (616) from the first encrypted form to generate the unencrypted video program, and then the video program is displayed (618), typically, on a television monitor connected to set-top box.

Figure 7:
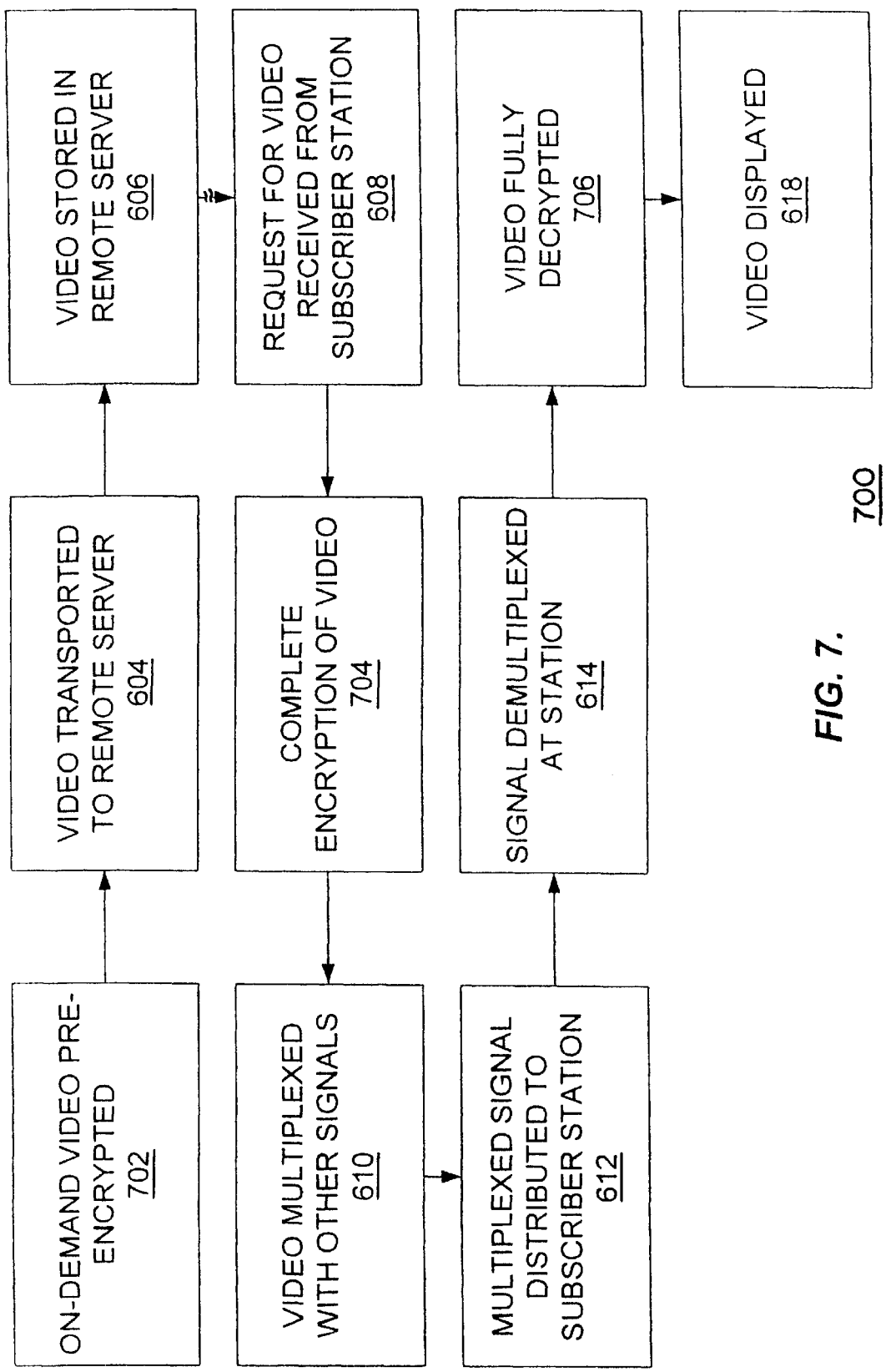
FIG. 7 is a flow chart depicting a secure process (700) for distributing video on-demand content via a cable distribution network (400) in accordance with a fourth aspect of the present invention.

FIG. 7 is a flow chart depicting a secure process (700) for distributing video on-demand content via a cable distribution network (400) in accordance with a fourth aspect of the present invention. The process (700) depicted in FIG. 7 may be called a multiple-layer encryption process. In comparison with the process (600) in FIG. 6, the process (700) in FIG. 7 "pre-encrypts" (702) the video program at the source (402), completes encryption (704) of the video program at the remote server (404), and fully decrypts (706) the video program at the subscriber station (110).

The pre-encryption step (702) may be implemented by applying a single DES encryption or a double DES encryption. If the pre-encryption step (702) uses a single DES encryption, then the completion of encryption step (704) may be implemented by applying a double DES encryption to achieve triple-DES encryption. Similarly, if the pre-encryption step (702) uses a double DES encryption, then the completion of encryption step (704) may be implemented by applying a single DES encryption to achieve triple-DES encryption. In either case, the video program is transported from the remote server (404) to the subscriber station (110) while under triple-DES encryption. As long as the subscriber station has the three keys required, it will be able to fully decrypt (706) the triple-DES encryption to obtain the unencrypted video program.

Figure 8:
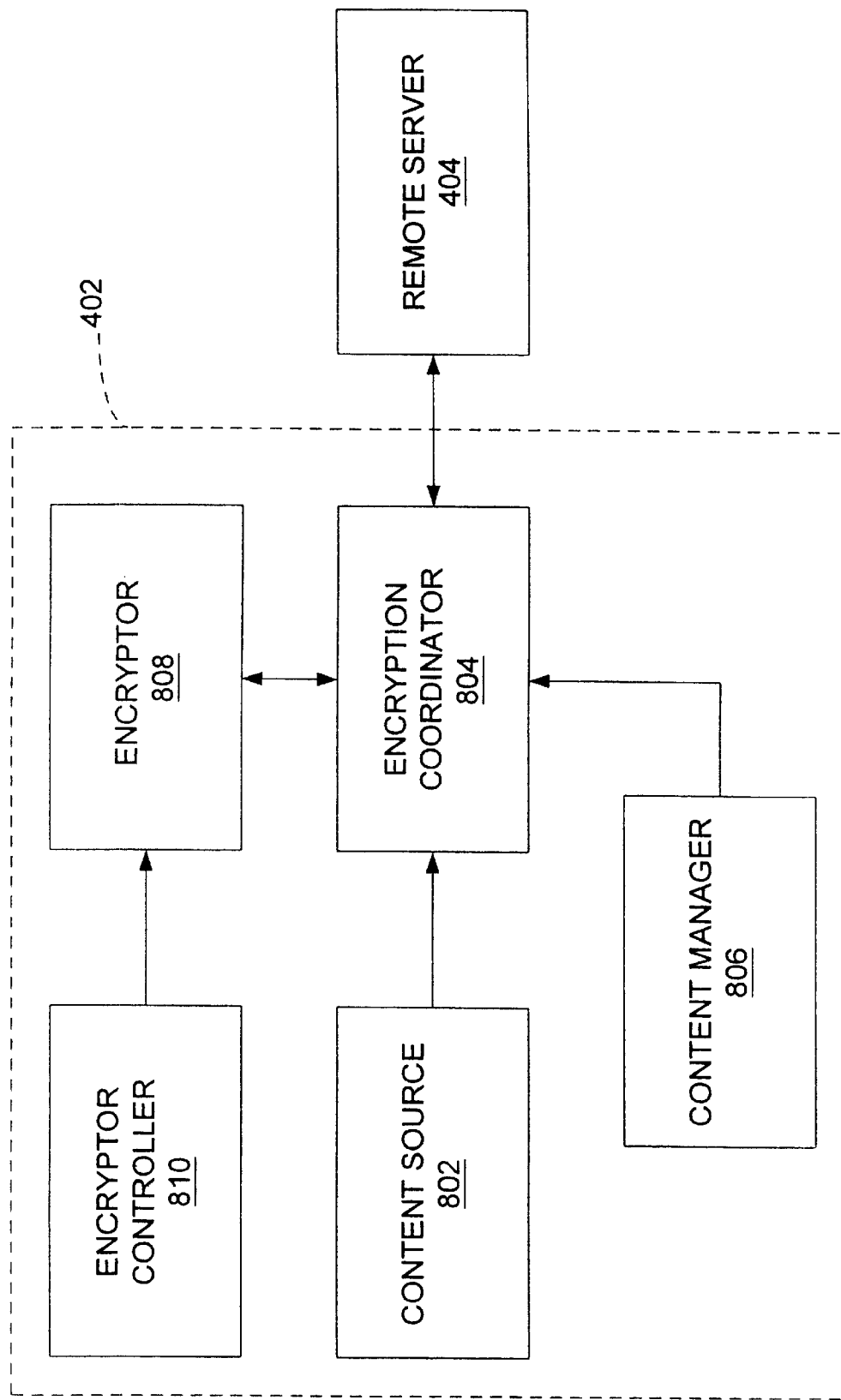
FIG. 8 is a schematic diagram showing interconnected components relating to encryption within the VOD source (402) in accordance with the fourth aspect of the present invention.

FIG. 8 is a schematic diagram showing interconnected components relating to encryption within the VOD source (402) in accordance with the fourth aspect of the present invention. The interconnected components include: a content source (802), a encryption coordinator (804), a content manager (806), a encryptor (808), and a encryptor controller (810). The operation of these components is discussed below in relation to FIGS. 9 and 10.

Figure 9:
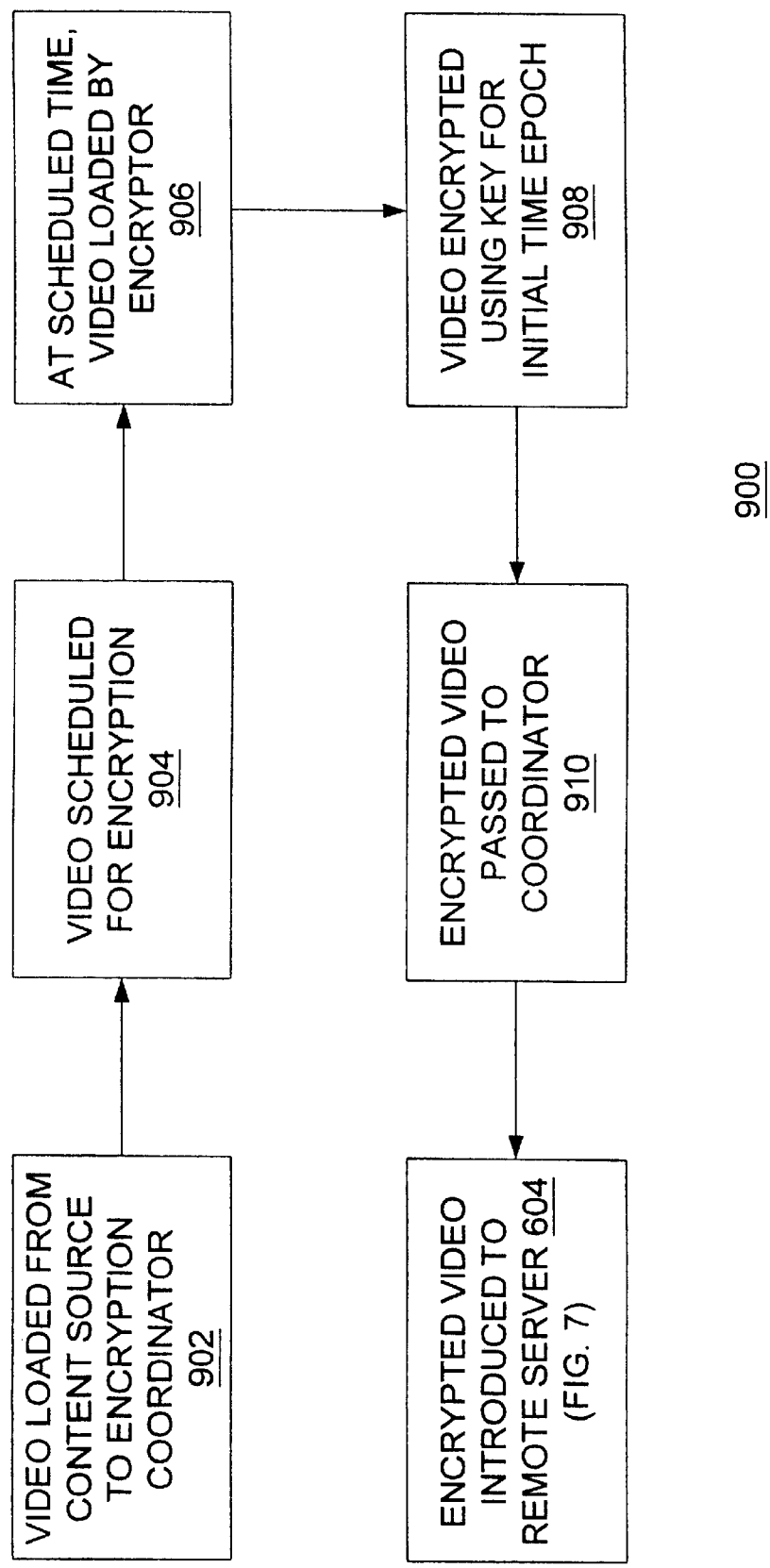
FIG. 9 is a flow chart depicting an initial process (900) for encrypting (502, 602, or 702) content at a VOD source (402) in accordance with a preferred embodiment of the present invention.

FIG. 9 is a flow chart depicting an initial process (900) for encrypting (502, 602, or 702) content at a VOD source (402) in accordance with the present invention. This initial process (900) occurs when the particular digital video content is introduced for the first time from the VOD source (402) to the remote server (404).

In a first step (902), the digital video content is loaded from the content source (802) to the encryption coordinator (804). In a second step (904), the encryption coordinator (804) receives the content and schedules the content for encryption. The scheduling of the encryption is performed by the encryption coordinator (804) under control of the content manager (806). The content manager holds the schedule information regarding times when a particular content, e.g. a movie, is scheduled to be encrypted (identified for which one of the encryption mechanisms described here) and distributed to a set of Remote Video Servers. The scheduling depends upon the other content already scheduled for encryption and upon the throughput of the encryptor. The schedule will be assigned and adjusted as necessary to accommodate the priorities and timing requirements of the various content to be encrypted.

In a third step (906), at the scheduled time for encryption, the content is loaded by the encryptor (808). In a fourth step (908), the encryptor (808) uses a particular key corresponding to the appropriate time epoch to encrypt the content. The encryption of the content is performed by the encryptor (808) under control of the encryptor controller (810). The encryptor controller is the first component of the end to end key management system. Since the encryption process may be single or multi-level encryption, e.g. DVB-Superscrambling or Triple DES, the encryption keys may change many times, periodically or aperiodically, during the encryption of a single content, i.e. every 5 minutes of a movie. These keys with index references to where the key change occurred in the content (markers), are delivered to the Remote Video Servers in a secure mechanism, e.g. RSA. In a fifth step (910), the encrypted content is passed back to the encryption coordinator (804). The encrypted content is then introduced (604) from the VOD source (402) to the remote server (404).

FIG. 10 is a flow chart depicting a renewal process (1000) for encrypting (502, 602, or 702) content at a VOD source (402) in accordance with the present invention. This renewal process (1000) occurs whenever encryption is to be renewed for particular digital video content stored on the remote server (404).

Prior to renewal process (1000), the digital video is stored on the remote server (404) in a encrypted form under a key of a "first" (not necessarily initial) time epoch. The first step (1002) of the renewal process (1000) relates to the nearing of the end of the first time epoch. In accordance with a preferred embodiment of the present invention, a time epoch does not need to correspond to a billing cycle. Rather, time epochs may be selected in order to afford proper protection for the content during the lifetime of the content on the remote server (404).

In a second step (1004), once the end of the first time epoch nears, the digital video content is copied from the remote server (404) back to the encryption coordinator (804) in the VOD source (402). In a third step (1006), the encryption coordinator (804) receives the content and schedules the content for encryption. The scheduling of the encryption is performed by the encryption coordinator (804) under control of the content manager (806).

In a fourth step (1008), at the scheduled time for encryption, the content is loaded by the encryptor (808). In a fifth step (1010), the encryptor (808) uses the particular key corresponding to the first time epoch to decrypt the content. Subsequently, in a sixth step (1012), the encryptor (808) uses a particular key corresponding to a "second" time epoch to re-encrypt the content. The decryption and re-encryption of the content is performed by the encryptor (808) under control of the encryptor controller (810). In a seventh step (1014), the re-encrypted content is passed back to the encryption coordinator (804). In an eighth step (1016), the re-encrypted content is then sent from the VOD source (402) to the remote server (404).

In a ninth step (1018), the first time epoch ends and the second time epoch begins. Finally, in a tenth step (1020), once the second time epoch begins, the remote server begins serving the version of the encrypted content which relates to the second time epoch and deletes the version which relates to the first time epoch.

Figure 11A:
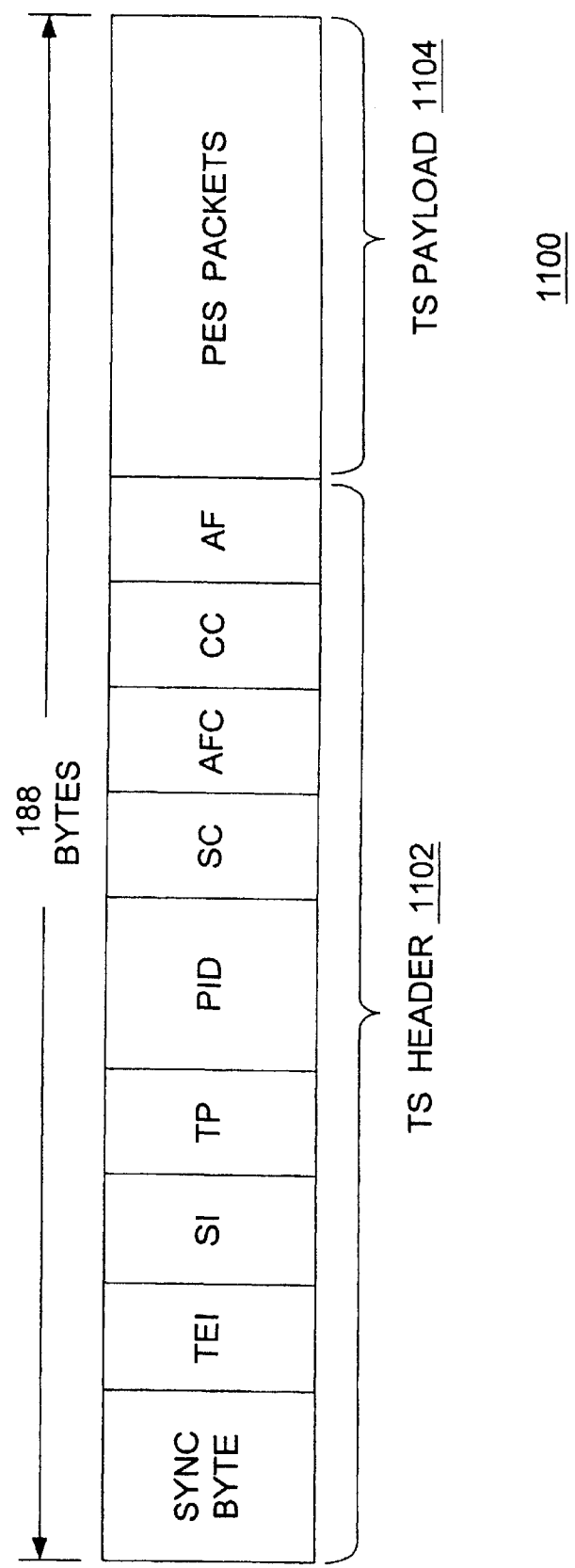
FIG. 11A is a schematic diagram showing a conventional MPEG-2 transport stream (TS) packet (1100).

FIG. 11A is a schematic diagram showing a conventional MPEG-2 transport stream (TS) packet (1100). The TS packet (1100) comprises a TS header (1102) and a TS payload (1104). The general contents of the TS header (1102) and TS payload (1104) are described below. Further details are given in various publications, including the MPEG-2 standard itself, formally referred to as ISO 13818.

As shown in FIG. 11A, the transport header (1102) may include a sync_byte, a transport_error_indicator (TEI), a payload_unit_start_indicator (SI), a transport_priority (TP), a packet ID (PID), a transport_scrambling_control (SC), an adaptation_field_control (AFC), a continuity_counter (CC), and an (optional) adaptation_field (AF). The sync_byte is used for synchronization purposes and generally has a fixed value of 0×47. The TEI is used to indicate an uncorrectable bit error exists in the current TS packet. The SI is used to indicate the presence in the transport payload (1104) of a new PES (packetized elementary stream) packet or a new TS-PSI (transport stream-program specific information) section. The TP is used to indicate a higher priority for the current TS packet. The PID is used to distinguish between elementary streams and so is used by a subscriber station (110) to find, identify, and reconstruct programs from the transport stream. The SC is used to indicate the scrambling mode of the transport payload (1104). The AFC is used to indicate the presence of an adaptation field. The CC increments with each nonrepeated TS packet having the corresponding PID. Finally, the AF may contains flags and indicators, a program clock reference, plus other data.

The TS payload (1104) includes PES packets which are described further below.

Figure 11B:
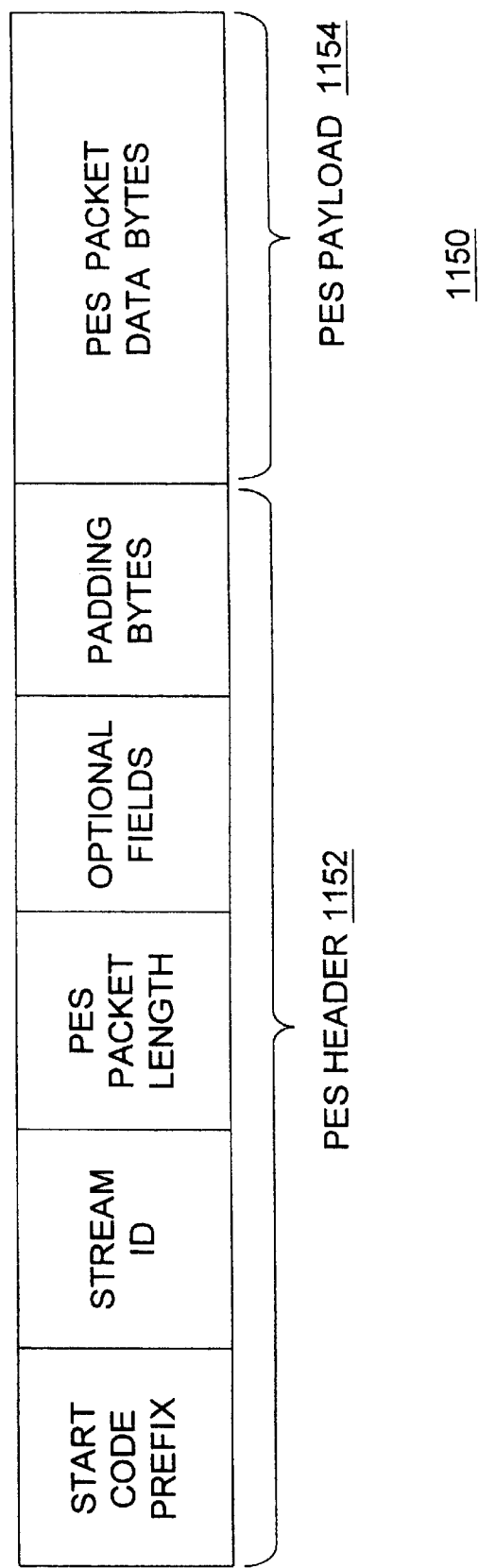
FIG. 11B is a schematic diagram showing a conventional MPEG-2 Packetized Elementary Stream (PES) packet (1150).

FIG. 11B is a schematic diagram showing a conventional MPEG-2 Packetized Elementary Stream (PES) packet (1150). The PES packet (1150) comprises a PES header (1152) and a PES payload (1154). The general contents of the PES header (1152) and PES payload (1104) are described below. Further details are given in various publications, including the MPEG-2 standard itself, formally referred to as ISO 13818.

As shown in FIG. 11B, the PES header (1152) includes a start_code_prefix, a stream_id, a PES_packet_length, optional fields, and padding_bytes. The start_code_prefix is a string of 23 or more binary 0s, followed by a binary 1. the start_code_prefix is followed by the stream_id. The stream_id comprises 8 bits which are used to label the PES, as well as to specify the type of PES. The PES_packet_length is used to indicate the number of bytes in the PES packet. Optional fields may include various fields. For PES packets carrying video, optional fields of particular significance include a presentation time stamp (PTS) and a decoding time stamp (DTS). The PTS tells the decoder when to display a video frame. The DTS tells the decoder when to decode a video frame. Finally, padding_bytes comprise fixed 8-bit values equal to 0×FF which are to be discarded by the decoder.

The PES payload (1154) includes PES packet data bytes which are contiguous bytes of data from the elementary stream. The elementary stream may consist of compressed data from a video source, or an audio source, or a data source.

Figure 12A:
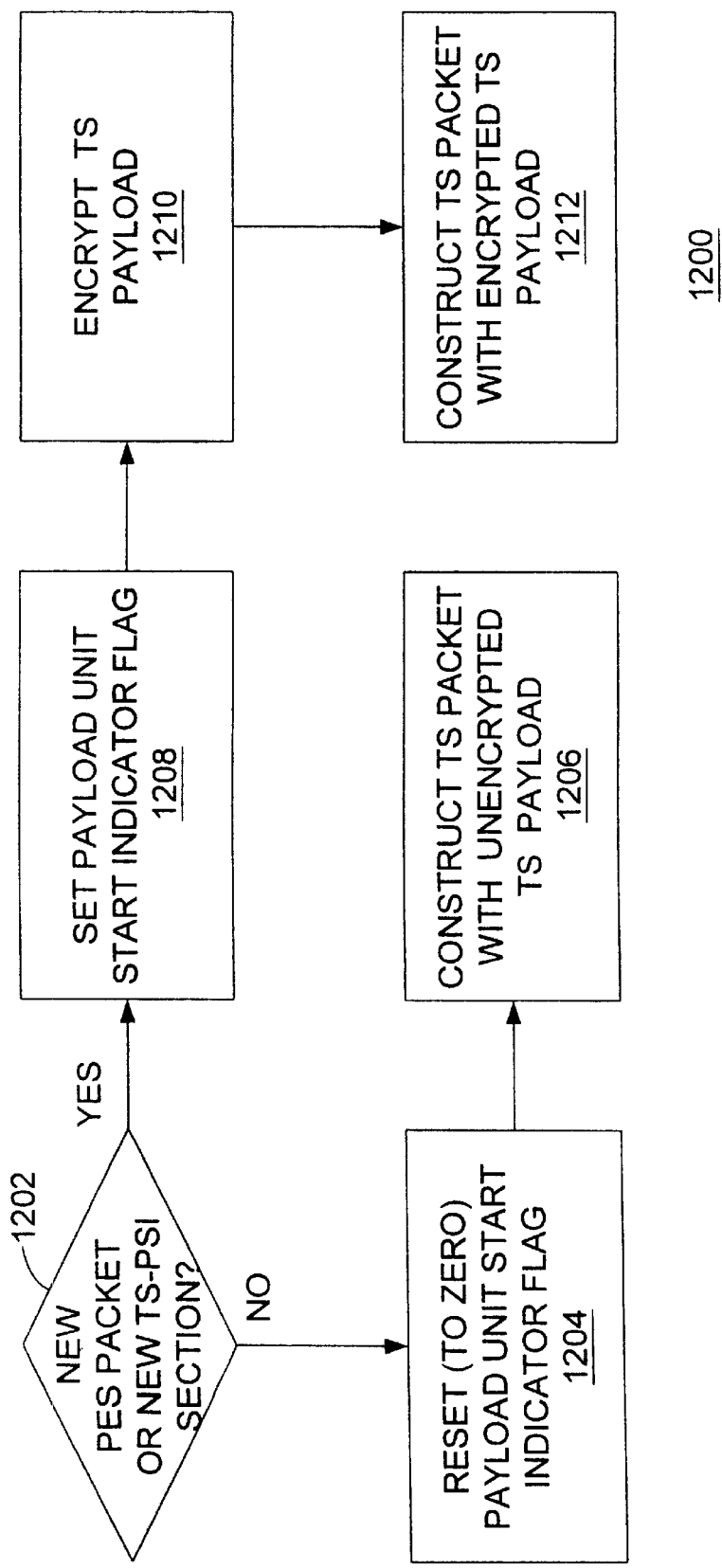
FIG. 12A is a flow chart depicting a process for selective encryption (1200) utilizing a payload unit start indicator (SI) in accordance with a first embodiment of the present invention.

FIG. 12A is a flow chart depicting a process for selective encryption (1200) utilizing the payload unit start indicator (SI) in accordance with a first embodiment of the present invention. This process (1200) may be utilized to reduce the amount of encryption required while maintaining a high level of security. This process (1200) is performed during the construction of the TS packet (1100).

In a first step (1202), a determination is made as to whether the TS payload (1104) will contain a new PES packet or a new TS-PSI section. If the TS payload (1104) will not contain a new PES packet or a new TS-PSI section, then in a second step (1204) the TS packet (1100) is constructed with the SI flag is reset to zero, and in a third step (1206) the TS packet (1100) is constructed with an unencrypted TS payload (1104). In alternate embodiments (not shown), the third step (1206) may occur before or in parallel with the second step (1204).

Otherwise, if the TS payload (1104) will contain a new PES packet or a new TS-PSI section, then in a fourth step (1208) the TS packet (1100) is constructed with the SI flag set to one, in a fifth step (1210) the TS payload (1104) is encrypted, and in a sixth step (1212) the TS packet (1100) is constructed with the encrypted TS payload (1104). In alternate embodiments (not shown), the fifth and sixth steps (1210 and 1212) may occur before or in parallel with the fourth step (1208). In this way, the amount of encryption required is advantageously reduced since only TS payloads (1104) containing a new PES packet or a new TS-PSI section will require encryption. Nevertheless, a high level of security is maintained because the beginning portion of each PES packet and TS-PSI section will be encrypted.

Figure 12B:
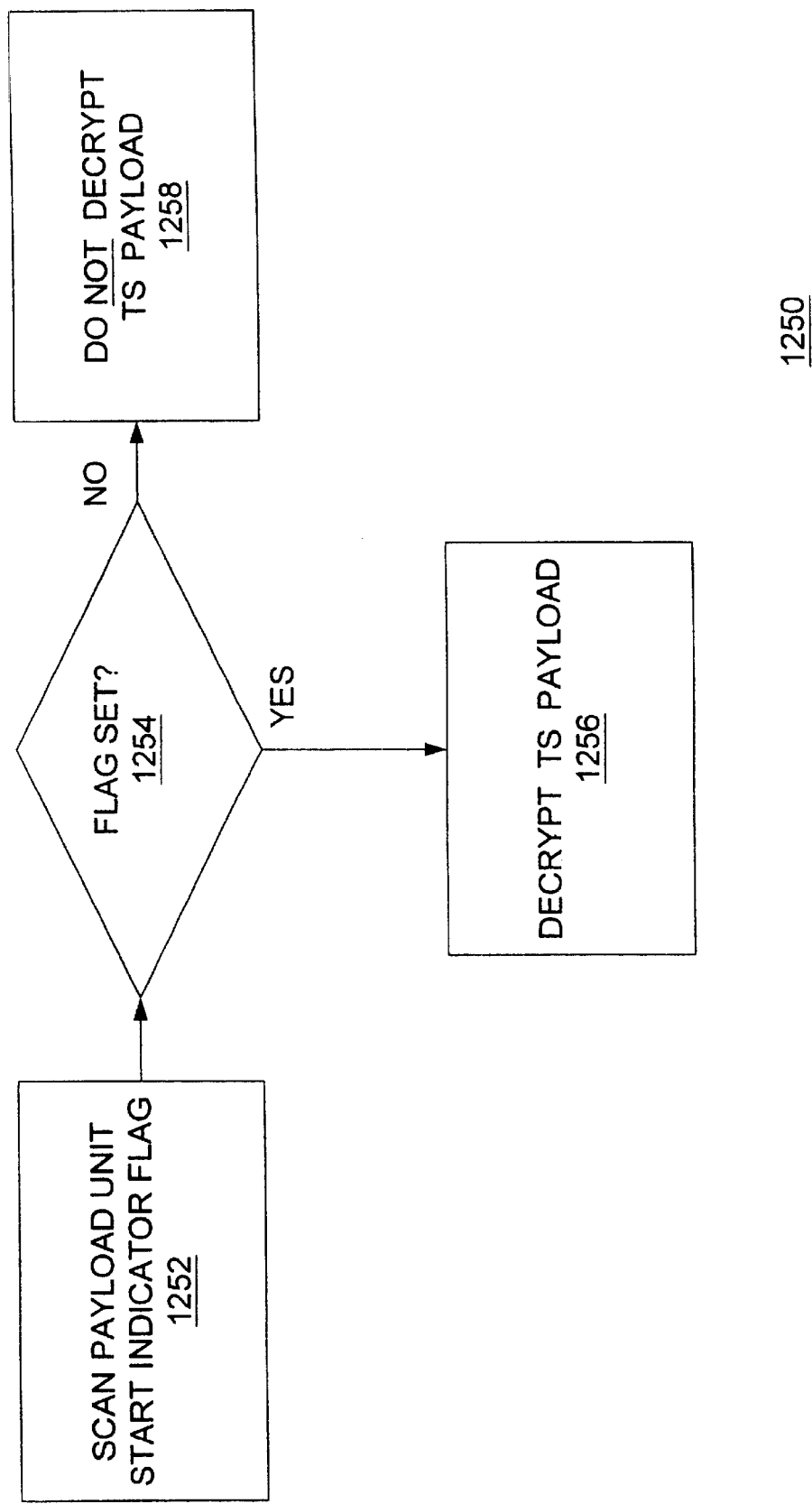
FIG. 12B is a flow chart depicting a process for selective decryption (1250) utilizing the payload unit start indicator (SI) in accordance with the first embodiment of the present invention.

FIG. 12B is a flow chart depicting a process for selective decryption (1250) using a payload unit start indicator in accordance with the first embodiment of the present invention. This process (1250) is utilized in conjunction with the process of FIG. 12A (1200) to reduce the amount of decryption required while maintaining a high level of security. This process (1250) is performed when the transport payload (1104) is decrypted (510, 616, or 706) either at the remote server (404) or at the subscriber station (110).

In a first step (1252), the payload unit start indicator (SI) flag is scanned. In a second step (1254), a determination is made as to whether the SI flag is set. If the SI flag is set, then in a third step (1256) the TS payload (1104) is decrypted to undo the encryption (1210). If the SI flag is not set, then in a fourth step (1258) the TS payload (1104) is not decrypted to undo the encryption (1210).

In this way, the amount of decryption required is advantageously reduced since only TS payloads (1104) containing a new PES packet or a new TS-PSI section will require decryption to undo the encryption (1210). Nevertheless, a high level of security is maintained because the beginning portion of each PES packet and TS-PSI section will require decryption to undo the encryption (1210).

Figure 13:
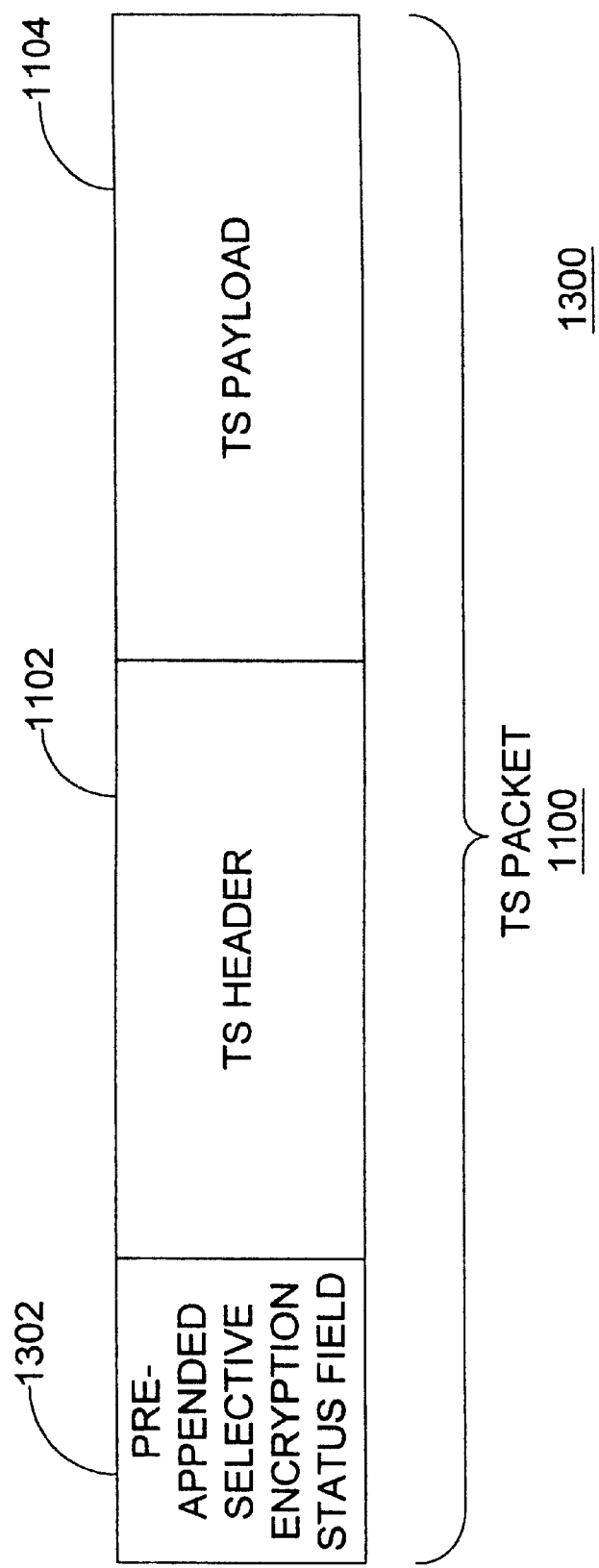
FIG. 13 is a schematic diagram showing a TS packet (1100) including a selective encryption status field (1302) in accordance with a second embodiment of the present invention.

FIG. 13 is a schematic diagram showing a TS packet (1100) including a selective encryption status field (1302) in accordance with a second embodiment of the present invention. As shown in FIG. 13, the selective encryption status field (1302) is pre-appended before the TS header (1102) in the structure of the TS packet (1100). Selective encryption status field is either prepended or the transport Scrambling Control (SC) flags are used to mark the selected encryption.

Figure 14A:
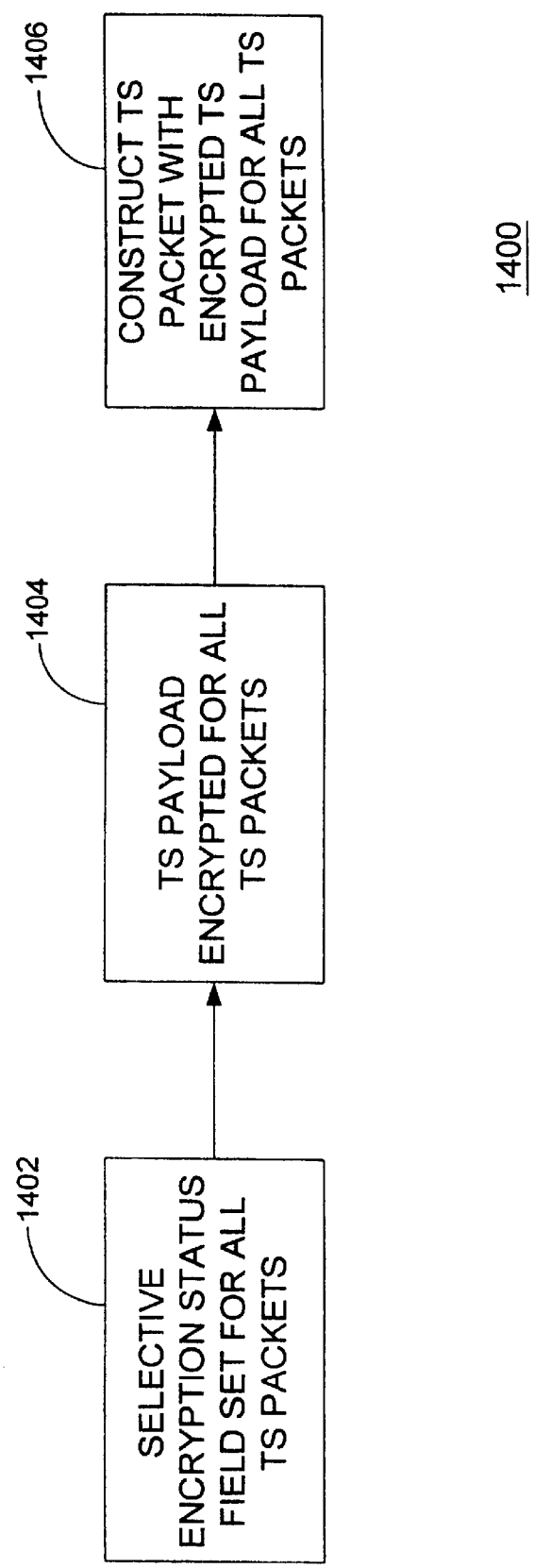
FIG. 14A is a flow chart depicting a first process for encryption (1400) in accordance with the second embodiment of the present invention.

FIG. 14A is a flow chart depicting a first process for encryption (1400) in accordance with the second embodiment of the present invention. The first process (1400) corresponds to a highest level of security, where the TS payload (1104) is encrypted for each and every TS packet (1100).

In accordance with this first process, in a first step (1402), the selective encryption status field (1302) is set. This first step (1402) is done for all TS packets (1100). In a second step (1404), the TS payload (1104) is encrypted. Since the selective encryption status field (1302) is set for all TS packets (1100), the TS payload (1104) is encrypted for all TS packets (1100). In a third step (1406), the TS packet (1100) is constructed using the encrypted TS payload for all TS packets (1100).

Figure 14B:
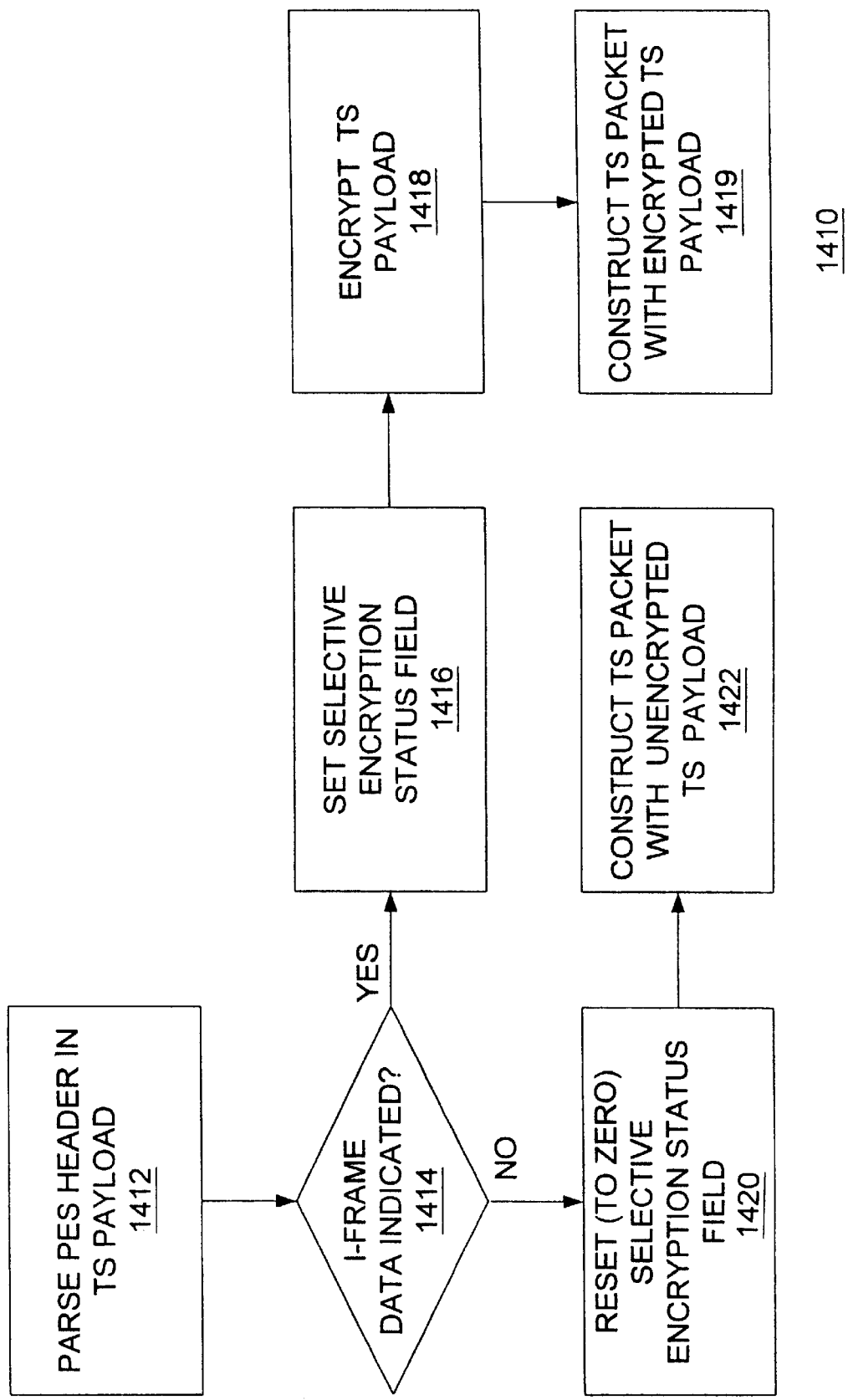
FIG. 14B is a flow chart depicting a second process for encryption (1410) in accordance with the second embodiment of the present invention.

FIG. 14B is a flow chart depicting a second process for encryption (1410) in accordance with the second embodiment of the present invention. The second process (1410) corresponds to an intermediate level of security, where the TS payload (1104) is encrypted only if it includes video data for a MPEG-2 I-frame (Intra frame). An I-frame contains full picture frames and are the least compressed type of frame.

In a first step (1412), all PES headers (1152) to be sent are parsed. In a second step (1414), a determination is made from the result of the parsing as to whether the current TS payload (1104) includes video data for an I-frame. On selective encryption, one of three modes are used to determine the selection of what TS packet to encrypt. Usually, the reference display information that is necessary to decoding is selected, i.e. I-Frame in a Group Of Pictures (GOP). Without the I-Frames, B-Frames and P-Frames cannot be used. First method is through the use of a marker that is prepended to the start of selected TS packets, before the sync byte. Second is through the use of information provided or added in the adaptation field of the PES headers. Third is through overloading existing fields in the header. An example of this is to use the Scrambling Control (SC) flags to tell the encryptor which TS packets to encrypt.

If I-frame data is indicated, then in a third step (1416) the selective encryption status field (1302) is set to one for the current TS packet (1100), in a fourth step (1418) the current TS payload (1104) is encrypted, and in a fifth step (1419) the current TS packet (1100) is constructed with the encrypted TS payload. Otherwise, if no I-frame data is indicated, then in a sixth step (1420) the selective encryption status field (1302) is reset to zero, and in a seventh step (1422) the TS packet (1100) is constructed with an unencrypted TS payload (1104).

Figure 14C:
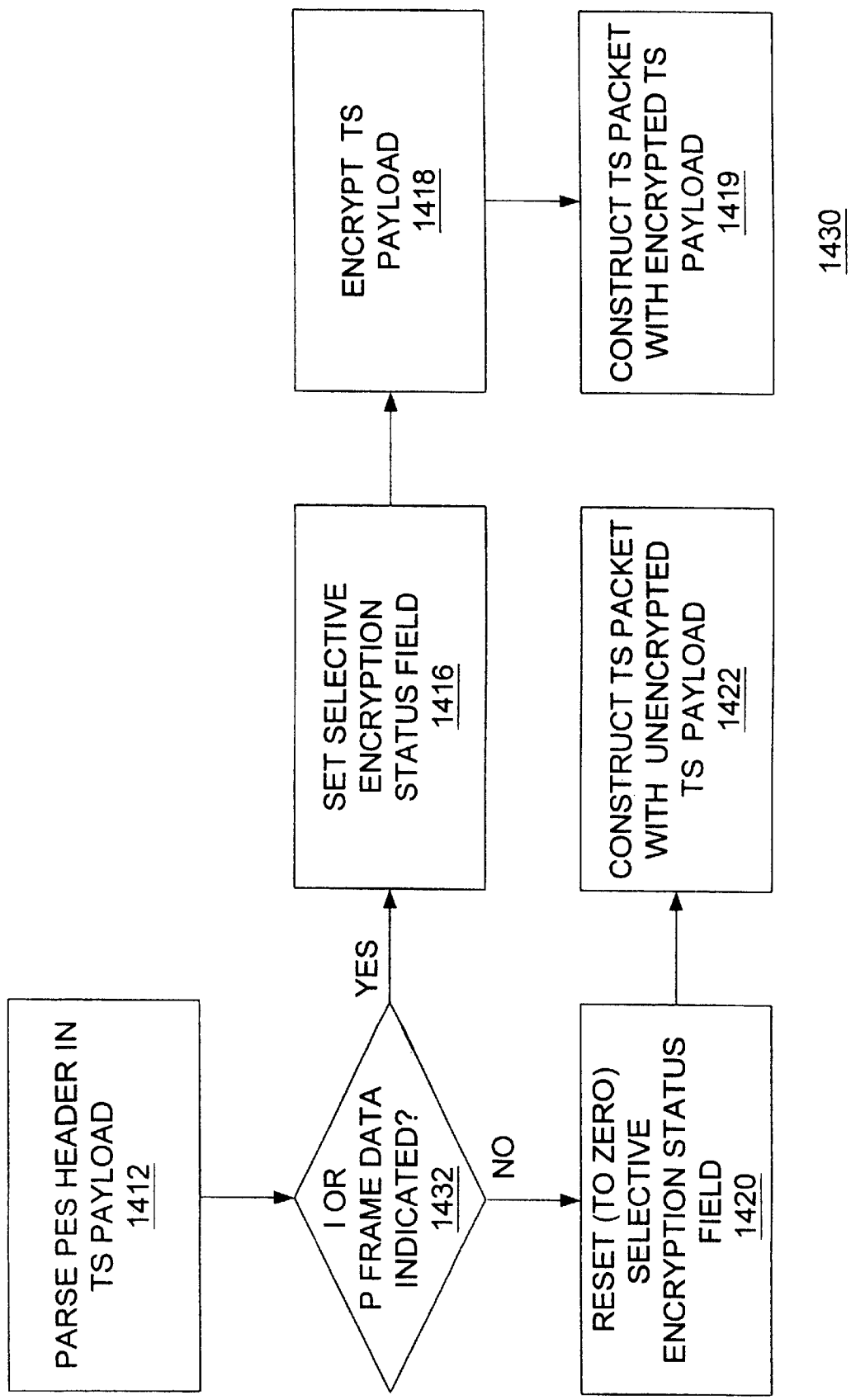
FIG. 14C is a flow chart depicting a third process for encryption (1430) in accordance with the second embodiment of the present invention.

FIG. 14C is a flow chart depicting a third process for encryption (1430) in accordance with the second embodiment of the present invention. The third process (1430) is similar to the second process (1410), except that in the third process (1430) the TS payload (1104) is encrypted if it includes video data for either a MPEG-2 I-frame or a MPEG-2 P-frame(Predicted frame). This third process (1430) would provide a level of security somewhere in between the levels provided by the first and the second process (1400 and 1410).

P-frames are predicted from past I or P frames. A third type of MPEG-2 frame is a B-frame (Bidirectional predicted frame). B-frames are predicted from past and future I and P frames. B frames offer the greatest compression of the three frame types.

Step-wise, the third process (1430) has a different second step (1432) compared with the second step (1414) of the second process (1410). In the second step (1432) of the third process (1430). a determination is made from the result of the parsing as to whether the current TS payload (1104) includes video data for an I or a P frame.

If I or P frame data is indicated, then in a third step (1416) the selective encryption status field (1302) is set to one for the current TS packet (1100), in a fourth step (1418) the current TS payload (1104) is encrypted, and in a fifth step (1419) the current TS packet (1100) is constructed with the encrypted TS payload. Otherwise, if neither I nor P frame data is indicated, then in a sixth step (1420) the selective encryption status field (1302) is reset to zero, and in a seventh step (1422) the TS packet (1100) is constructed with an unencrypted TS payload (1104).

Figure 14D:
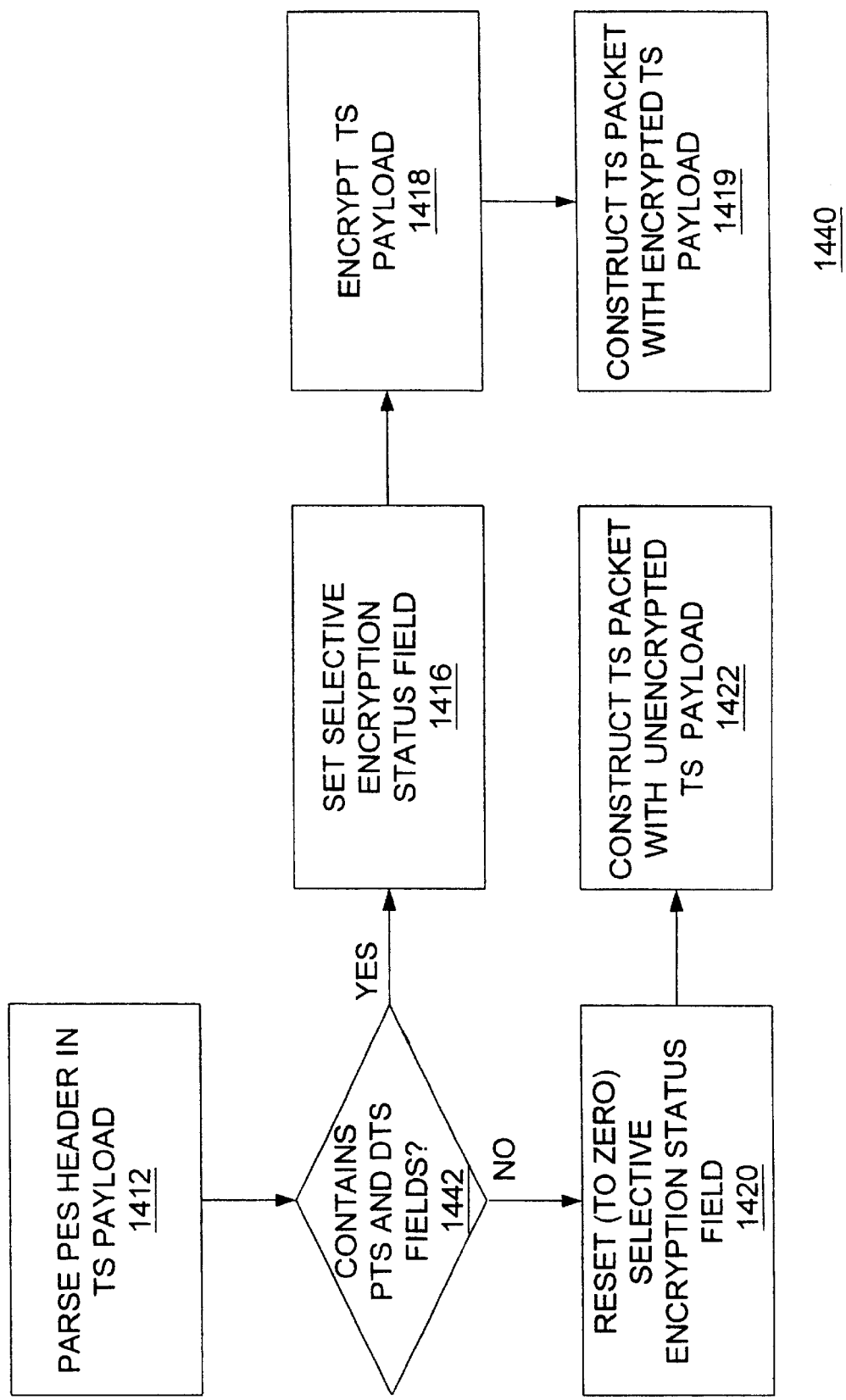
FIG. 14D is a flow chart depicting a fourth process for encryption (1440) in accordance with the second embodiment of the present invention.

FIG. 14D is a flow chart depicting a fourth process for encryption (1440) in accordance with the second embodiment of the present invention. The fourth process (1440) is similar to the second process (1410), except that in the fourth process (1430) the TS payload (1104) is encrypted if it includes a decode time stamp (DTS) and/or a presentation time stamp (PTS).

The DTS and PTS are included in PES headers (1152) in order to indicate to the decoder when to decode and present, respectively, a video frame. Without the DTS and PTS, a decoder cannot properly decode and present the video data.

Step-wise, the fourth process (1440) has a different second step (1442) compared with the second step (1414) of the second process (1410). In the second step (1442) of the fourth process (1440). a determination is made from the result of the parsing as to whether the current TS payload (1104) includes a DTS and/or PTS.

If a DTS and/or PTS is indicated, then in a third step (1416) the selective encryption status field (1302) is set to one for the current TS packet (1100), in a fourth step (1418) the current TS payload (1104) is encrypted, and in a fifth step (1419) the current TS packet (1100) is constructed with the encrypted TS payload. Otherwise, if neither DTS nor PTS is indicated, then in a sixth step (1420) the selective encryption status field (1302) is reset to zero, and in a seventh step (1422) the TS packet (1100) is constructed with an unencrypted TS payload (1104).

Figure 14E:
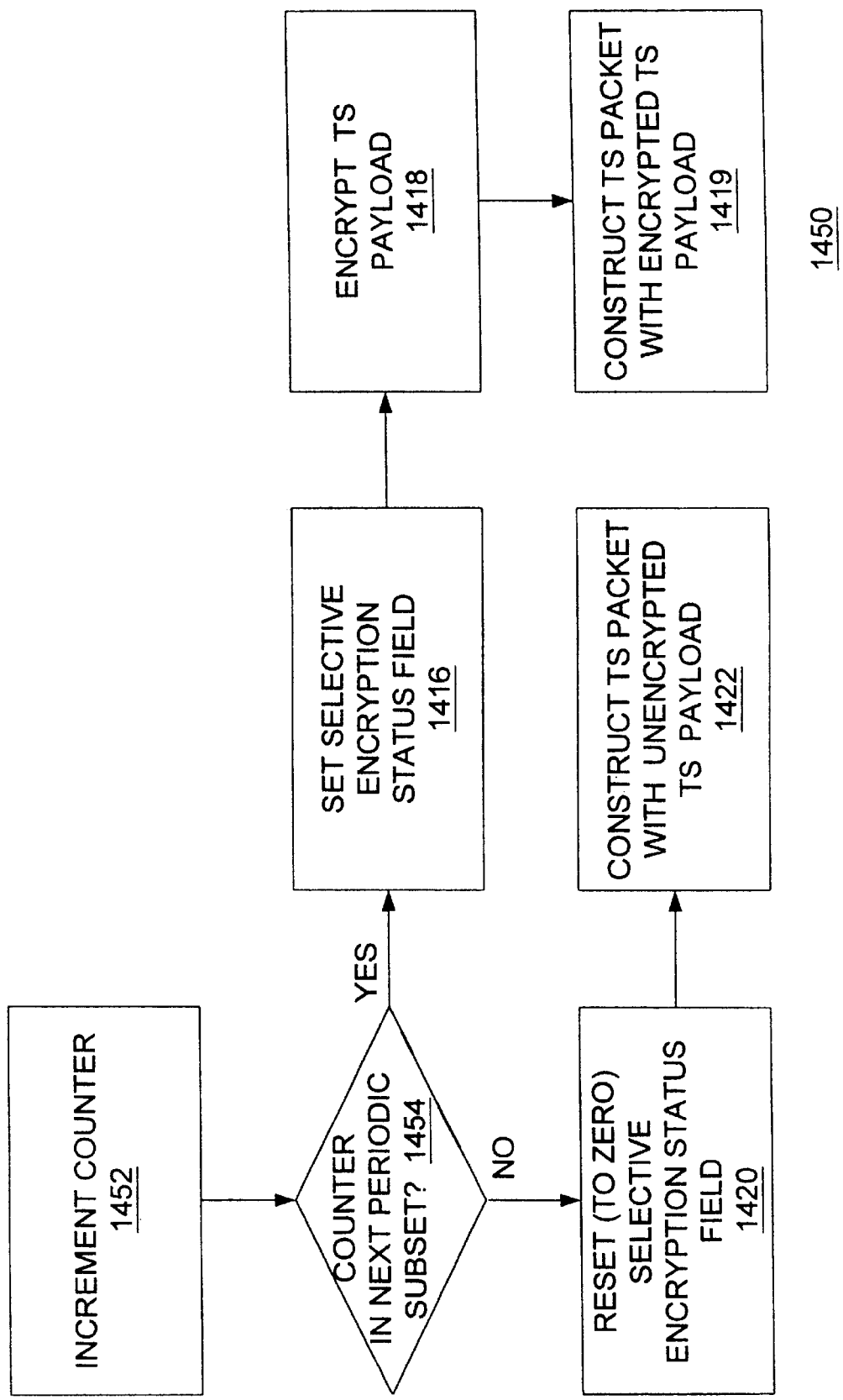
FIG. 14E is a flow chart depicting a fifth process for encryption (1450) in accordance with the second embodiment of the present invention.

FIG. 14E is a flow chart depicting a fifth process for encryption (1450) in accordance with the second embodiment of the present invention. The fifth process (1450) is similar to the second process (1410), except that in the fifth process (1450) the TS payload (1104) is encrypted if it is selected by a counter.

Step-wise, the fifth process (1450) has different first and second steps than the second process (1410). In the first step (1452), a counter is incremented. In the second step (1454), a determination is made as to whether the counter has been incremented to a next periodic subset of counts (for example, to a next subset of ten counts).

If the counter has been incremented to a next periodic subset of counts, then in a third step (1416) the selective encryption status field (1302) is set to one for the current TS packet (1100), in a fourth step (1418) the current TS payload (1104) is encrypted, and in a fifth step (1419) the current TS packet (1100) is constructed with the encrypted TS payload.

Otherwise, if the counter is still within a same periodic subset of counts, then in a sixth step (1420) the selective encryption status field (1302) is reset to zero, and in a seventh step (1422) the TS packet (1100) is constructed with an unencrypted TS payload (1104).

Figure 14F:
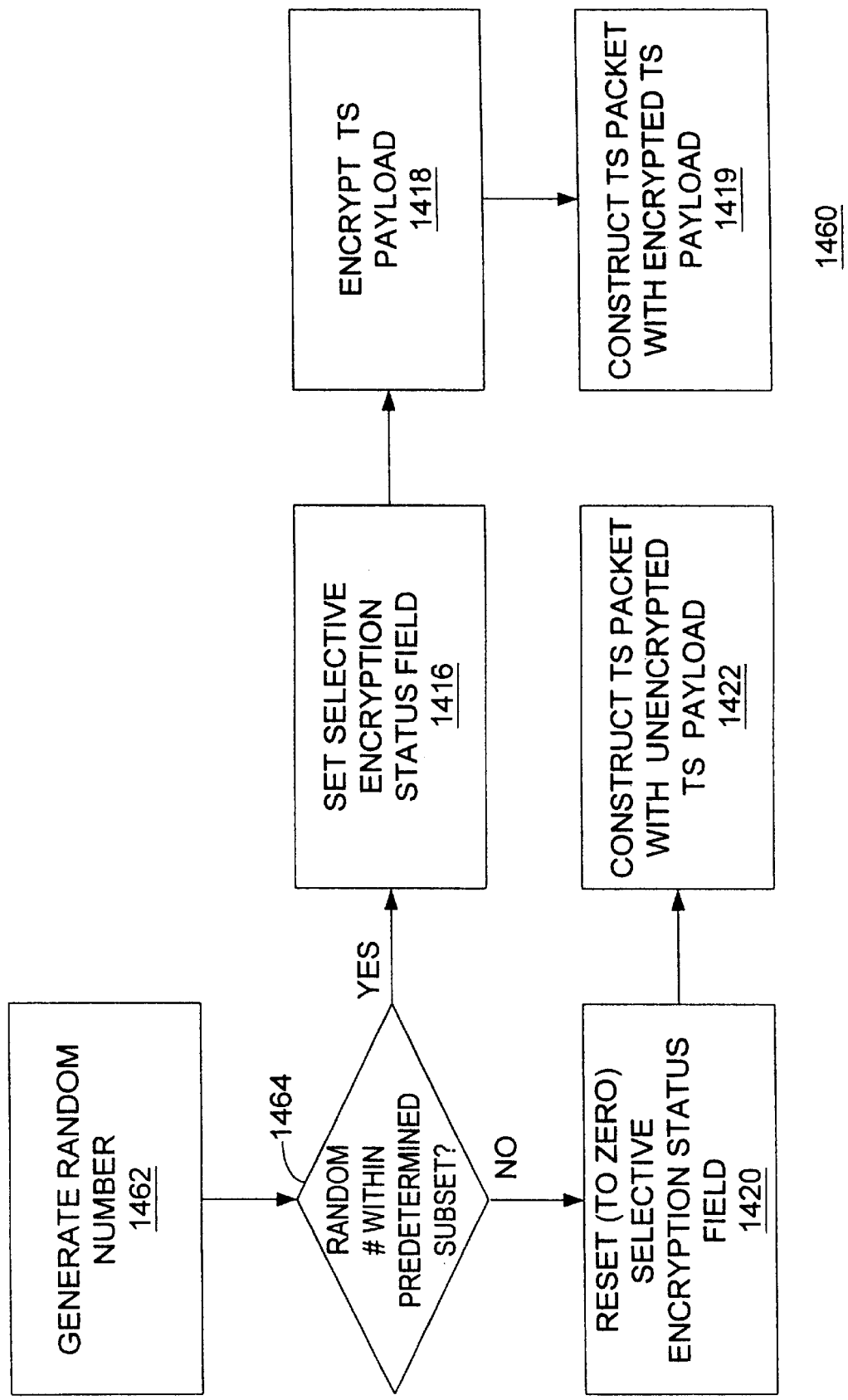
FIG. 14F is a flow chart depicting a sixth process for encryption (1460) in accordance with the second embodiment of the present invention.

FIG. 14F is a flow chart depicting a sixth process for encryption (1460) in accordance with the second embodiment of the present invention. The sixth process (1460) is similar to the second process (1410), except that in the sixth process (1450) the TS payload (1104) is encrypted if it is selected by a random selection.

Step-wise, the sixth process (1460) has different first and second steps than the second process (1410). In the first step (1462), a random number is generated. In the second step (1454), a determination is made as to whether the random number selected is within a predetermined subset of a set of possible random numbers (for example, within a subset from 0 to 9 of a set from 0 to 99).

If the random number selected is within the predetermined subset, then in a third step (1416) the selective encryption status field (1302) is set to one for the current TS packet (1100), in a fourth step (1418) the current TS payload (1104) is encrypted, and in a fifth step (1419) the current TS packet (1100) is constructed with the encrypted TS payload. Otherwise, if the random number selected is outside of the predetermined subset, then in a sixth step (1420) the selective encryption status field (1302) is reset to zero, and in a seventh step (1422) the TS packet (1100) is constructed with an unencrypted TS payload (1104).

Figure 15:
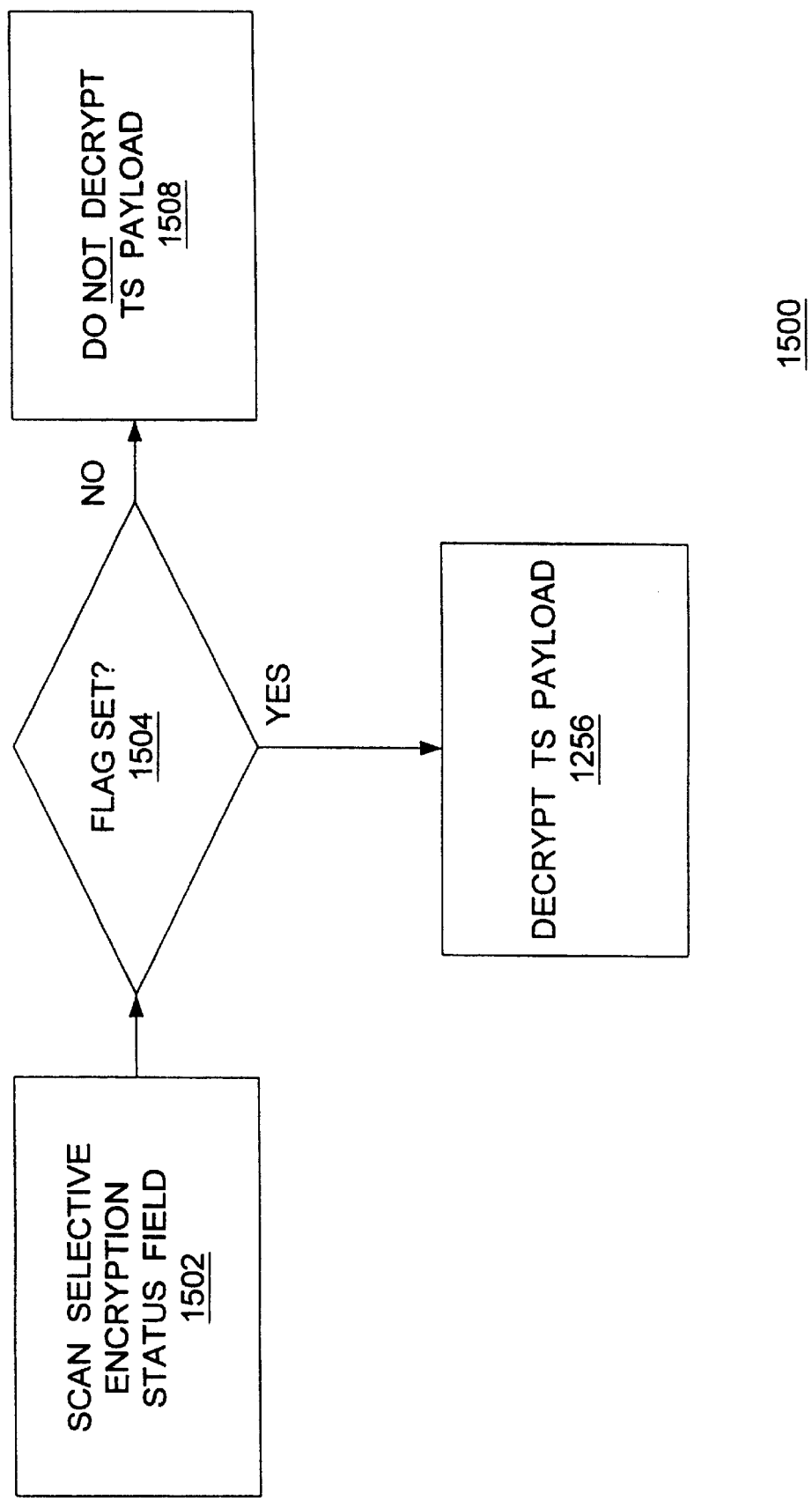
FIG. 15 is a flow chart depicting a process for decryption (1500) in accordance with the second embodiment of the present invention.

FIG. 15 is a flow chart depicting a process for decryption (1500) in accordance with the second embodiment of the present invention. The decryption process (1500) in FIG. 15 is utilized in conjunction with one of the six encryption processes (1400, 1410, 1430, 1440, 1450, and 1460) shown in FIGS. 14A–F. This decryption process (1500) is performed when the transport payload (1104) is decrypted (510, or 616, or 706) either at the remote server (404) or at the subscriber station (110).

In a first step (1502), the selective encryption status field (1302) is scanned. In a second step (1504), a determination is made as to whether the status field (1302) is set. If the status field (1302) is set, then in a third step (1506) the TS payload (1104) is decrypted to undo the encryption (1418). If the status field (1302) is not set, then in a fourth step (1508) the TS payload (1104) is not decrypted to undo the encryption (1418).

In this way, the amount of decryption required is advantageously reduced since only select TS payloads (1104) will require decryption to undo the encryption (1418). Nevertheless, a substantial level of security is maintained because select TS payloads (1104) will require decryption to undo the encryption (1418).

It is to be understood that the specific mechanisms and techniques which have been described are merely illustrative of one application of the principles of the invention. For example, while the present invention is described in application to video on-demand, it also has some application in broadcast video. Numerous additional modifications may be made to the methods and apparatus described without departing from the true spirit of the invention.

In the above description as well as in the following claims, a field or flag may be configured such that it is set to indicate a first state and reset to indicate a second state. Nevertheless, it is well understood in the art that the field or flag may be equivalently configured such that it is reset to indicate the first state and set to indicate the second state.

What is claimed is:

1. A secure method for providing digital video programming, the method comprising:

determining whether a predetermined criterion for encryption is satisfied;

setting a selective encryption status field if the predetermined criterion is satisfied;

encrypting an unencrypted payload to generate an encrypted payload, and constructing a packet with the encrypted payload, if the predetermined criterion is satisfied;

resetting the selective encryption status field if the predetermined criterion is unsatisfied;

constructing the packet with the unencrypted payload, if the predetermined criterion is unsatisfied; and transmitting the packet.

2. The method of claim 1, wherein the predetermined criterion comprises an indication that intra frame data is contained in the unencrypted payload.

3. The method of claim 1, wherein the predetermined criterion comprises an indication that the payload includes data from a group of data including intra frame data and predicted frame data.

4. The method of claim 1, wherein the predetermined criterion comprises an indication that the payload includes a time stamp.

5. The method of claim 1, wherein the predetermined criterion comprises a counter being incremented to a next periodic subset of counts.

6. The method of claim 1, wherein the predetermined criterion comprises a random number being selected within a predetermined subset of a set of possible random numbers.

7. The method of claim 1, wherein the predetermined criterion is always satisfied.

8. The method of claim 1, wherein the predetermined criterion comprises an indication that the unencrypted payload includes a new packetized elementary stream packet, and the selective encryption status field comprises a payload unit start indicator flag.

9. The method of claim 1, wherein the predetermined criterion comprises an indication that the unencrypted payload includes a new program specific information section, and the selective encryption status field comprises a payload unit start indicator flag.

10. The method of claim 1, further comprising:

receiving the packet;

scanning the selective encryption status field;

determining whether the selective encryption status field is set; and decrypting the encrypted payload if the selective encryption status field is set.

11. The method of claim 1, wherein the payload comprises a transport stream payload, and the packet comprises a transport stream packet.

12. The method of claim 1, wherein the selective encryption status field is preappended to the transport stream packet.

13. The method of claim 1, wherein the digital video programming comprises video on-demand.

14. The method of claim 1, wherein the digital video programming comprises broadcast video.

15. An apparatus for securely providing digital video programming, the apparatus comprising:

a determining device configured to determine whether a predetermined criterion is satisfied;

a setting device configured to set a selective encryption status field if the predetermined criterion is satisfied;

an encrypting device configured to encrypt an unencrypted payload to generate an encrypted payload, and a first constructing device configured to construct a packet with the encrypted payload, if the predetermined criterion is satisfied;

a resetting device configured to reset the selective encryption status field if the predetermined criterion is unsatisfied;

a second constructing device configured to construct the packet with the unencrypted payload, if the predetermined criterion is unsatisfied; and a transmitting device configured to transmit the packet.

16. A secure method for providing digital video programming, the method comprising:

copying a first encrypted digital video program from a remote server to a video source;

decrypting the first encrypted digital video program using a first key to generate an unencrypted digital video program;

encrypting the unencrypted digital video program using a second key to generate a second encrypted digital video program;

transmitting the second encrypted digital video program from the video source to the remote server; and deleting the first encrypted digital video program from the remote server.

17. The method of claim 16, wherein the first key corresponds to a first time epoch during which the remote server provides the first encrypted digital video program to subscriber stations, and the second key corresponds to a second time epoch during which the remote server provides the second encrypted digital video program to the subscriber stations.

18. The method of claim 17, further comprising, prior to deleting the first encrypted digital video program from the server, transitioning from the first time epoch to the second time epoch.

19. The method of claim 18, wherein the first and second time epochs do not correspond to billing cycles.

20. The method of claim 16, further comprising, prior to decrypting the first encrypted digital video program, scheduling the first encrypted digital video program for renewal of encryption.

21. The method of claim 16, further comprising, prior to copying the first encrypted digital video program, a process for introducing an initial encrypted digital video program to the remote server.

22. An apparatus for securely providing digital video programming, the apparatus comprising:

an encryption coordinator configured to receive a first encrypted digital video program from a remote server;

an encryptor configured to decrypt the first encrypted digital video program using a first key to generate an unencrypted digital video program and to encrypt the unencrypted digital video program using a second key to generate a second encrypted digital video program, wherein the encryption coordinator receives the second encrypted digital video program from the encryptor and transmits the second encrypted digital video program to the remote server.

23. The apparatus of claim 22, wherein, prior to decrypting the first encrypted digital video program, the encryption coordinator schedules the first encrypted digital video program for renewal of encryption.

* * * * *